US009225972B2

(12) United States Patent
Payne et al.

(10) Patent No.: US 9,225,972 B2
(45) Date of Patent: Dec. 29, 2015

(54) THREE DIMENSIONAL (3D) IMAGE GENERATION USING ELECTROMECHANICAL DISPLAY ELEMENTS

(75) Inventors: Richard S. Payne, Andover, MA (US); Jignesh Gandhi, Burlington, MA (US); Jianru Shi, Haverhill, MA (US)

(73) Assignee: Pixtronix, Inc., San Diego, CA (US)

( * ) Notice: Subject to any disclaimer, the term of this patent is extended or adjusted under 35 U.S.C. 154(b) by 593 days.

(21) Appl. No.: 13/571,868

(22) Filed: Aug. 10, 2012

(65) Prior Publication Data

US 2014/0043370 A1     Feb. 13, 2014

(51) Int. Cl.
*H04N 13/04*     (2006.01)

(52) U.S. Cl.
CPC ....... *H04N 13/0413* (2013.01); *H04N 13/0418* (2013.01); *H04N 13/0452* (2013.01)

(58) Field of Classification Search
CPC .......... H04N 13/0413; H04N 13/0418; H04N 13/0452; H04N 13/0402
See application file for complete search history.

(56) References Cited

U.S. PATENT DOCUMENTS

| 6,195,150 | B1 | 2/2001 | Silverbrook |
| 6,674,463 | B1 | 1/2004 | Just et al. |
| 6,759,998 | B2 | 7/2004 | Schkolnik |
| 6,859,240 | B1 | 2/2005 | Brown et al. |
| 7,224,526 | B2 | 5/2007 | Putilin et al. |
| 7,417,665 | B2 | 8/2008 | Banju et al. |
| 7,847,869 | B2 | 12/2010 | Nelson et al. |
| 8,223,089 | B2 | 7/2012 | Kusuno |
| 2003/0058209 | A1 | 3/2003 | Balogh |
| 2004/0008251 | A1 | 1/2004 | Mashitani et al. |
| 2006/0050384 | A1 | 3/2006 | Agostinelli |
| 2007/0165305 | A1 | 7/2007 | Mehrle |
| 2008/0117233 | A1 | 5/2008 | Mather et al. |
| 2008/0204873 | A1 | 8/2008 | Daniell |
| 2009/0195855 | A1 | 8/2009 | Steyn et al. |

(Continued)

FOREIGN PATENT DOCUMENTS

DE     102007046414 A1     4/2009
EP          0829743 A2     3/1998

(Continued)

OTHER PUBLICATIONS

Brosnihan T, et al., "Pixtronix Digital Micro Shutter Display Technology—A MEMS Display for Low Power Mobile Multimedia Displays", SPIE, Feb. 16, 2010, XP040518068.

(Continued)

*Primary Examiner* — Latanya Bibbins
(74) *Attorney, Agent, or Firm* — Edward A. Gordon; Foley & Lardner LLP

(57) ABSTRACT

An apparatus for displaying three-dimensional (3D) images includes an array of display elements and a controller. The controller can control a set of display elements in the array to form, at a first time, a first eye image corresponding to input data by causing the light modulators to be driven into a first set of positions. The first eye image includes an angular distribution of light weighted towards a first side of the display. The controller also can control the same set of display elements to form, at a second time, a second eye image corresponding to input data by causing the light modulators to be driven into a second set of positions. The second eye image includes an angular distribution of light weighted towards an opposite side of the display.

30 Claims, 20 Drawing Sheets

(56) References Cited

U.S. PATENT DOCUMENTS

| | | | |
|---|---|---|---|
| 2010/0208041 A1 | 8/2010 | Savvateev et al. |
| 2011/0115882 A1 | 5/2011 | Shahinian et al. |
| 2011/0157339 A1 | 6/2011 | Bennett et al. |
| 2011/0157471 A1 | 6/2011 | Seshadri et al. |
| 2011/0298902 A1 | 12/2011 | Kim et al. |
| 2011/0304601 A1 | 12/2011 | Niioka et al. |
| 2012/0026161 A1 | 2/2012 | Chen et al. |
| 2012/0062565 A1 | 3/2012 | Fuchs et al. |
| 2012/0086776 A1 | 4/2012 | Lo |
| 2012/0154455 A1 | 6/2012 | Steyn et al. |
| 2012/0206503 A1 | 8/2012 | Hirakata et al. |
| 2012/0287505 A1 | 11/2012 | Chang et al. |
| 2013/0050177 A1 | 2/2013 | Sato |
| 2014/0071118 A1 | 3/2014 | Tyler |
| 2014/0078274 A1 | 3/2014 | Kroon et al. |
| 2014/0254007 A1 | 9/2014 | Ma et al. |

FOREIGN PATENT DOCUMENTS

| | | | |
|---|---|---|---|
| GB | 2422737 A | 8/2006 |
| GB | 2473636 A | 3/2011 |
| KR | 20080021958 A | 3/2008 |
| TW | 201142357 A | 12/2011 |
| WO | 2005071474 A2 | 8/2005 |
| WO | 2007070721 A2 | 6/2007 |

OTHER PUBLICATIONS

Chikazawa Y, "Autostereoscopic Display Utilizing Microreflector Array", Ip.com Journal, Ip.com Inc., West Henrietta, NY, US, Mar. 12, 2007, XP013118592, ISSN: 1533-0001.

International Search Report and Written Opinion—PCT/US2013/053792—ISA/EPO—Jan. 30, 2014.

Liao C. D., et al., "The Evolution of MEMS Displays", IEEE Transactions on Industrial Electronics, IEEE Service Center, Piscataway, NJ, USA, vol. 56, No. 4, Apr. 1, 2009, pp. 1057-1065, XP011248674, ISSN: 0278-0046.

Partial International Search Report—PCT/US2013/053792—ISA/EPO—Nov. 12, 2013.

Lee, et al., "Auto-stereoscopic 3D displays with reduced crosstalk," Optics express, vol. 19, No. 24, pp. 24762-24774, Nov. 17, 2011.

Lee, et al., "Image Distortion Correction for Lenticular Misalignment in Three-Dimensional Lenticular Displays," Optical Engineering, 45(1), 9 pages, 2006.

Zhang, et al., "DMD-based autostereoscopic display system for 3D interaction," Electronic Letters, Jan. 3, 2008, vol. 33 No. 1, pp. 22-23.

Taiwan Search Report—TW102128392—TIPO—Oct. 28, 2014.

Bergquist Johan, "Resolution and contrast requirements on mobile displays for different applications in varying luminous environments", Multimedia Technologies Laboratory, Nokia Research Centre, Japan, 2005, pp. 3.

Taiwan Search Report—TW103108225—TIPO—Jan. 7, 2015.

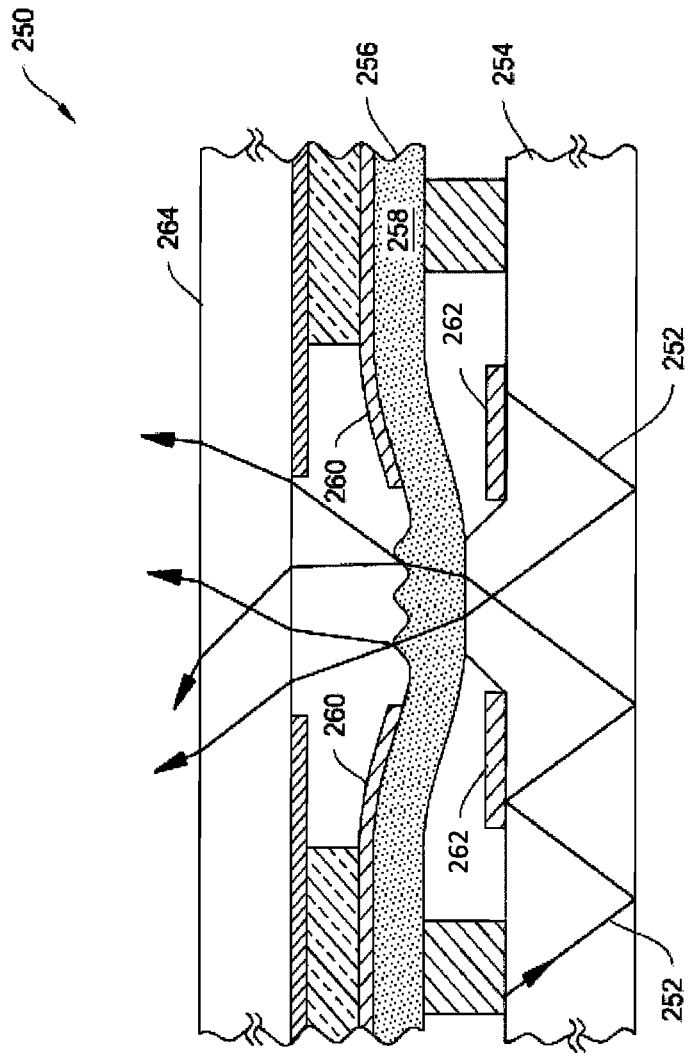

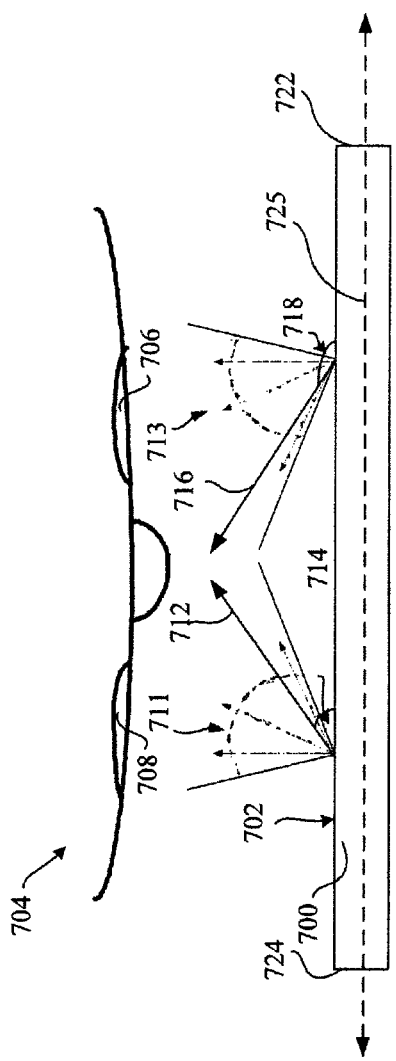
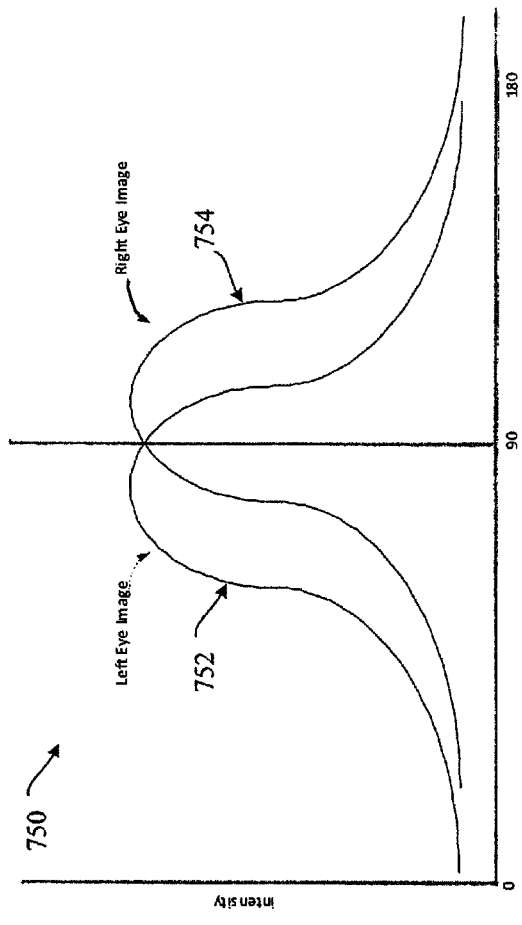
FIGURE 7A
FIGURE 7B

802

| L | R | L | R |
|---|---|---|---|
| R | L | R | L |
| L | R | L | R |
| R | L | R | L |

| L | R | L | R |
|---|---|---|---|
| L | R | L | R |
| L | R | L | R |
| L | R | L | R |

| L | L | L | L |
|---|---|---|---|
| L | L | L | L |
| L | L | L | L |
| L | L | L | L |

862  t = 2

| R | R | R | R |
|---|---|---|---|
| R | R | R | R |
| R | R | R | R |
| R | R | R | R |

FIGURE 8C

THREE DIMENSIONAL (3D) IMAGE GENERATION USING ELECTROMECHANICAL DISPLAY ELEMENTS

TECHNICAL FIELD

This disclosure relates to the field of electromechanical systems (EMS). In particular, this disclosure relates to three-dimensional (3D) image generation using electromechanical display elements.

DESCRIPTION OF THE RELATED TECHNOLOGY

An image is perceived in three-dimensions by creating or enhancing the illusion of depth in an image. This is done by presenting two offset images separately to the left and right eye of a viewer. Traditionally, 3D viewing has been achieved by providing a viewer with glasses that, through varying techniques, enable each of the viewers' eyes to view a slightly different image. For example, the images for each eye were formed using light of different polarity or of different colors, and glasses worn by the viewer included polarization or color filters, accordingly. The difference between the two images resulted in a perception of depth, or a perceived third dimension. The demand for glasses-free 3D displays is growing. Viewers no longer want to have to wear special glasses to perceive 3D images, particularly when using mobile devices.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus for displaying three-dimensional (3D) images, including an array of display elements and a controller. The controller can control a set of display elements in the array to form, at a first time, a first eye image corresponding to input data by causing the display elements to be driven into a first set of states. The first eye image includes an angular distribution of light weighted towards a first side of the apparatus. The controller also can control the same set of display elements to form, at a second time, a second eye image corresponding to input data by causing the display elements to be driven into a second set of states. The second eye image includes an angular distribution of light weighted towards a second side of the apparatus, opposite the first side. In some implementations, the apparatus can include a rear aperture layer having rear apertures and a front aperture layer having front apertures, wherein the array of display elements is positioned between the rear aperture layer and the front aperture layer.

In some implementations, each of the display elements includes a shutter and is configured to be driven into at least three states including a non-transmissive state in which a shutter of a light modulator substantially obstructs a corresponding aperture, a first light transmissive state in which the shutter partially obstructs the corresponding aperture on a first side, and a second light transmissive state in which the shutter partially obstructs the aperture on a second side opposite the first side.

In some implementations, the controller can cause at least some of the display elements, selected based on the input data, to be driven into the first light transmissive state to form the first eye image and cause at least some of the display elements, selected based on the input data, to be driven into the second transmissive state. In some implementations, the controller can cause a display element to be driven into the first light transmissive state by causing a first voltage to be applied to an actuator coupled to the display element and can cause the display element to be driven into a second light transmissive state by applying a second different voltage to the actuator.

In some implementations, the controller is configured to cause at least one display element to be driven into a third transmissive state that provides a neutral distribution of light. In some implementations, the controller is configured to generate two-dimensional images by causing the display elements to be driven into the third light transmissive state.

In some implementations, the apparatus includes a rear aperture layer having a plurality of rear apertures and a front aperture layer having a plurality of front apertures. The array of display elements is positioned between the rear aperture layer and the front aperture layer. In some implementations, the front aperture layer includes a light blocking material. In some implementations, the rear aperture layer includes a first surface proximate the array of display elements and the first surface of the aperture layer including at least one of a reflective material and a light absorbing material. In some implementations, the display elements comprise light modulators. In some implementations, the light modulators include shutter-based light modulators. In some implementations, the apparatus includes a display module incorporating the array of display elements and the controller, a processor configured to process image data and a memory device that is configured to communicate with the processor.

In some implementations, the controller includes at least one of the processor and the memory device. In some implementations, the apparatus includes a driver circuit configured to send at least one signal to the display module and the processor is further configured to send at least a portion of the image data to the driver circuit.

In some implementations, the apparatus includes an image source module configured to send the image data to the processor. In some such implementations, the image source module includes at least one of a receiver, transceiver, and transmitter. In some implementations, the apparatus includes an input device configured to receive input data and to communicate the input data to the processor.

Another innovative aspect of the subject matter described in this disclosure can be implemented in a display apparatus for generating 3D images having a rear aperture layer including rear apertures, a first set of EMS shutter-based display elements, each including a shutter that has light blocking portions and at least one shutter aperture. The display elements are configured to be driven between a non-transmissive state in which the light blocking portions of the shutter block substantially all light passing through a corresponding rear aperture and a first light transmissive state. In the first light transmissive state, a center of the at least one shutter aperture of the shutter is offset relative to a center of a corresponding rear aperture in a first direction such that light passing through the at least one shutter aperture has an angular distribution weighted more heavily towards the first direction. The display apparatus also includes a second set of EMS shutter-based display elements, each including a shutter having light blocking portions and at least one shutter aperture. These light modulators are configured to be driven between the non-transmissive state in which the light blocking portions of the shutter block substantially all light passing through a corresponding rear aperture and a second light-transmissive state.

In the second light transmissive state, a center of the at least one shutter aperture of the shutter is offset relative to a center of a corresponding rear aperture in a second direction such that light passing through the at least one shutter aperture has an angular distribution weighted more heavily towards the second direction. In some implementations, the first set of EMS shutter-based display elements form a first-eye image that includes an angular distribution of light weighted towards a first side of the display apparatus and the second set of EMS shutter-based display elements form a second-eye image that includes an angular distribution of light weighted towards a second side of the display apparatus.

In some implementations, the display elements of the first set of EMS shutter-based display elements include first optical elements corresponding to the first front apertures and configured to direct light towards the first side of the display apparatus. The display elements of the second set of EMS shutter-based display elements include a plurality of second optical elements corresponding to the second front apertures and configured to direct light towards the second side of the display apparatus. In some implementations, the first optical elements and the second optical elements include at least one of microlenses and prisms.

In some implementations, the display apparatus includes a front aperture layer having front apertures. The first set of MEMS shutter-based display elements and the second set of MEMS shutter-based display elements are positioned between the rear aperture layer and the front aperture layer. In some implementations, the front aperture layer includes a first surface including a light blocking material. In some implementations, the rear aperture layer includes a first surface including at least one of a reflective material and a light absorbing material. In some implementations, the EMS shutter-based display elements include MEMS devices.

Another innovative aspect of the subject matter described in this disclosure can be implemented in a display apparatus for generating 3D images that includes a rear aperture layer having rear apertures, a front aperture layer deposited on a front substrate of the display apparatus includes a layer of light blocking material and front apertures that are formed on the layer of light blocking material. The front apertures are positioned relative to the rear apertures such that the light blocking material overlaps a first edge of a first set of rear apertures such that light passing through a first set of the rear apertures exits the display apparatus to form a first eye image that includes an angular distribution of light weighted towards a first side of the display apparatus. The front apertures are also positioned relative to the rear apertures such that the light blocking material overlaps a second edge opposite the first edge of a second set of rear apertures such that light passing through the second set of rear apertures exit the display apparatus to form a second eye image that includes an angular distribution of light weighted towards a second side opposite the first side of the display apparatus. The display apparatus also includes a plurality of display elements configured to selectively control an amount of light passing through the front apertures from the rear apertures.

In some implementations, the display apparatus includes a plurality of first optical elements corresponding to the first rear apertures that are configured to direct light towards the first side of the display apparatus and a plurality of second optical elements corresponding to the second rear apertures and configured to direct light towards the second side of the display apparatus. In some implementations, the plurality of first optical elements and the plurality of second optical elements include at least one of microlenses and prisms.

In some implementations, the front apertures are defined by a first portion of light blocking material and a second portion of light blocking material. For each of the first set of rear apertures, a corresponding first portion of light blocking material overlaps the first edge of a respective rear aperture in a first direction. For each of the second set of rear apertures, a corresponding second portion of light blocking material overlaps the second edge of a respective rear aperture in the second direction opposite the first direction. In some implementations, for each of the first set of rear apertures, the second portion of light blocking material is aligned with the second edge of the corresponding rear aperture in the first direction and for each of the second front apertures, the first portion of light blocking material is aligned with the first edge of the corresponding rear aperture in the second direction opposite the first direction.

In some implementations, the display apparatus includes a controller configured to drive light modulators into selected states to form the first eye and second eye images. In some implementations, the first set of rear apertures and the second set of rear apertures alternate with respect to each another every row and every column of the display apparatus. In some implementations, the first set of rear apertures and the second set of rear apertures alternate with respect to each another every column of the display apparatus.

Another innovative aspect of the subject matter described in this disclosure can be implemented in a method for generating 3D images using a display. The method includes controlling an array of display elements to form, at a first time, a first eye image corresponding to input data by causing the display elements to be driven into a first set of states. The first eye image includes an angular distribution of light weighted towards a first side of the display. A light source is illuminated to display the first eye image. The method also includes controlling the array of display elements to form, at a second time, a second eye image corresponding to input data by causing the same display elements to be driven into a second set of states. The second eye image includes an angular distribution of light weighted towards a second side of the display. The light source is illuminated to display the second eye image. In some implementations, the method also includes controlling the array of display elements to form a neutral image corresponding to input data by causing the same display elements to be driven into a third set of states, wherein a neutral image includes an angular distribution of light weighted substantially equally towards a first side of the display and the second side of the display. The light source is illuminated to display the neutral image.

In some implementations, the display elements can be caused to be driven into the first set of states by applying a first voltage to actuators associated with the display elements. The display elements can be caused to be driven into the second set of states by applying a second different voltage to the actuators associated with the display elements. In some implementations, the display elements include shutters that have light blocking portions that overlap a first portion of the respective apertures when the display elements are driven into the first set of positions and overlap a second different portion of the respective apertures when the display elements are driven into the second set of positions. In some implementations, the first eye image and the second eye image can be displayed according to a subframe sequence in which the first eye image and the second eye image are displayed in an alternating manner.

Another innovative aspect of the subject matter described in this disclosure can be implemented in a computer-readable storage medium having computer-executable instructions stored on the storage medium. The computer-executable instructions, when executed by a computer, can cause the computer to control an array of display elements to form, at a first time, a first eye image corresponding to input data by causing the display elements to be driven into a first set of states. The first eye image includes an angular distribution of light weighted towards a first side of the display. The computer also can be caused to illuminate a light source to display the first eye image. The computer also can be caused to control the array of display elements to form, at a second time, a second eye image corresponding to input data by causing the same display elements to be driven into a second set of states. The second eye image includes an angular distribution of light weighted towards a second side of the display. The computer also can be caused to illuminate the light source to display the second eye image.

In some implementations, the display elements can be caused to be driven into the first set of states by applying a first voltage to actuators associated with the display elements. The display elements also can be caused to be driven into the second set of states by applying a second different voltage to the actuators associated with the display elements. In some implementations, the computer also can be caused to control the array of display elements to form a neutral image corresponding to input data by causing the same display elements to be driven into a third set of states, wherein a neutral image includes an angular distribution of light weighted substantially equally towards a first side of the display and the second side of the display. The computer also can be caused to illuminate the light source to display the neutral image.

In some implementations, the display elements can be caused to be driven into the first set of states by applying a first voltage to actuators associated with the display elements. The display elements can be caused to be driven into the second set of states by applying a second voltage to the actuators associated with the display elements. In some implementations, the display elements include shutters that have light blocking portions that overlap a first portion of the respective apertures when the display elements are driven into the first set of positions and overlap a second different portion of the respective apertures when the display elements are driven into the second set of positions. In some implementations, the first eye image and the second eye image can be displayed according to a subframe sequence in which the first eye image and the second eye image are displayed in an alternating manner.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCD), organic light emitting diode (OLED), electrophoretic, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 2C shows a cross sectional view of an illustrative non shutter-based microelectromechanical systems (MEMS) light modulator.

FIG. 7A shows an example display apparatus that generates a left-eye image and a right-eye image for viewing by a viewer.

FIG. 7B shows an example diagram of two curves indicating angular distribution of light that form left and right-eye images in the display apparatus depicted in FIG. 7A.

FIG. 8A shows an example portion of a display.

FIG. 8B shows another example portion of a display.

FIG. 8C shows an example portion of a display at two points in time.

Like reference numbers and designations in the various drawings indicate like elements.

DETAILED DESCRIPTION

Figure 1A:
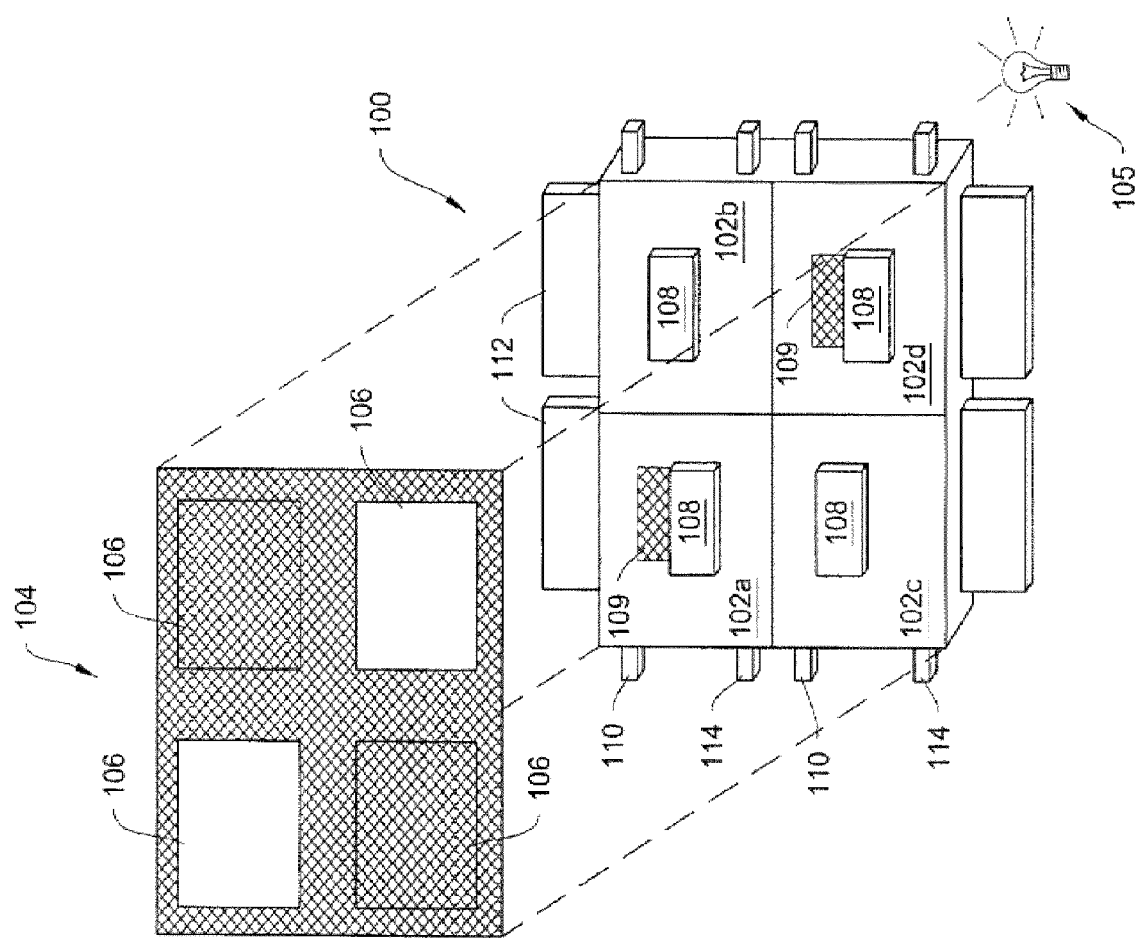
FIG. 1A shows an example schematic diagram of a direct-view MEMS-based display apparatus.

This disclosure relates to systems and methods for generating three-dimensional (3D) images using display elements. In particular, certain display apparatus including display elements can be used to achieve 3D image generation without a viewer needing to wear glasses. To generate a 3D image, a display apparatus can be caused to form a right-eye image and a left-eye image. A right-eye image is an image formed from light having an angular distribution weighted more heavily towards a right eye of a viewer, and conversely, a left-eye image is an image formed from light having an angular distribution weighted more heavily towards a left eye of the viewer.

Several architectures can be employed to generate 3D images using display elements. In some implementations, the display elements may be electromechanical systems (EMS) display elements or microelectromechanical systems (MEMS) display elements. In some implementations, the display elements may be light modulators. Some architectures rely on a spatial multiplexing of two sets of light modulators. In some implementations using this architecture, a display relies on a relative positioning of the light blocking portions of a light blocking layer relative to apertures formed in an underlying aperture layer to generate distinct left-eye and right-eye images. In other implementations, optical elements are used to generate left-eye and right-eye images by redirecting light such that light transmitted by the pixels has an angular distribution weighted more heavily towards one side of the display apparatus relative to an opposite side. In some other implementations, a display relies on a degree of overlap that exists between light blocking portions of a shutter and corresponding apertures formed in an underlying aperture layer when the shutters are in an open position. In such implementations, some displays can create 3D images via temporal multiplexing of light modulators instead of relying on a spatial multiplexing of two sets of light modulators. That is, in some implementations, these displays may be configured to alternately use the same set of light modulators to produce both left-eye images and right-eye images.

Particular implementations of the subject matter described in this disclosure can be implemented to realize one or more of the following potential advantages. A left-eye image having an angular distribution weighted more heavily towards the left eye and a right-eye image having an angular distribution weighted more heavily towards the right eye of a viewer can create the perception of a 3D. Using the techniques described herein, display apparatus can generate left-eye images and right-eye images to form 3D images that can be perceived by viewers without having to use of special glasses. In some implementations, 3D images can even be created without reducing screen resolution by temporally multiplexing between left-eye and right-eye images. Display apparatus disclosed herein can dynamically switch between display of two dimensional (2D) and 3D images. This is particularly useful for displays in mobile devices, where special glasses may not be readily accessible.

FIG. 1A shows a schematic diagram of a direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (e.g., interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
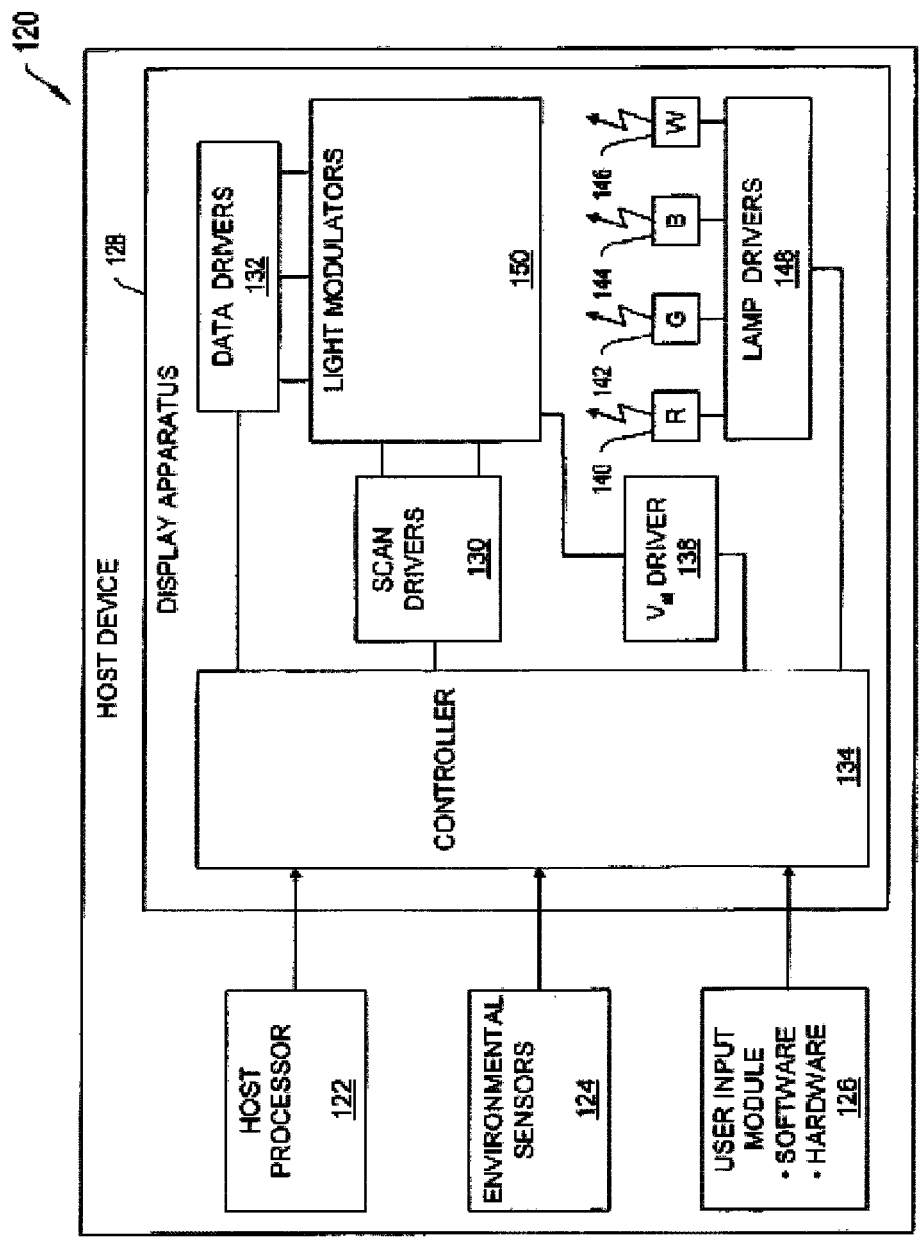
FIG. 1B shows an example block diagram of a host device.

FIG. 1B shows an example of a block diagram 120 of a host device (i.e., cell phone, smart phone, PDA, MP3 player, tablet, e-reader, etc.). The host device includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and light modulators 150. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the light modulators, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all light modulators within the array of light modulators, for instance by supplying voltage to a series of common interconnects 114. In some other implementations, the common drivers 138, following commands from the controller 134, issue voltage pulses or signals to the array of light modulators, for instance global actuation pulses which are capable of driving and/or initiating simultaneous actuation of all light modulators in multiple rows and columns of the array.

All of the drivers (e.g., scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array of pixels, the output of voltages from the data drivers 132, and the output of voltages that provide for light modulator actuation.

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the modulator array by a sequential addressing of individual rows, also referred to as scan lines. For each row or scan line in the sequence, the scan driver 130 applies a write-enable voltage to the write enable interconnect 110 for that row of the array, and subsequently the data driver 132 supplies data voltages, corresponding to desired shutter states, for each column in the selected row. This process repeats until data has been loaded for all rows in the array. In some implementations, the sequence of selected rows for data loading is linear, proceeding from top to bottom in the array. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array is separated in time from the process of actuating the shutters 108. In these implementations, the modulator array may include data memory elements for each pixel in the array and the control matrix may include a global actuation interconnect for carrying trigger signals, from common driver 138, to initiate simultaneous actuation of shutters 108 according to data stored in the memory elements.

In alternative implementations, the array of pixels and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The host processor 122 generally controls the operations of the host. For example, the host processor may be a general or special purpose processor for controlling a portable electronic device. With respect to the display apparatus 128, included within the host device 120, the host processor outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device. The environmental sensor module receives data about the ambient environment, such as temperature and or ambient lighting conditions. The sensor module 124 can be programmed to distinguish whether the device is operating in an indoor or office environment versus an outdoor environment in bright daylight versus and outdoor environment at nighttime. The sensor module communicates this information to the display controller 134, so that the controller can optimize the viewing conditions in response to the ambient environment.

Figure 2A:
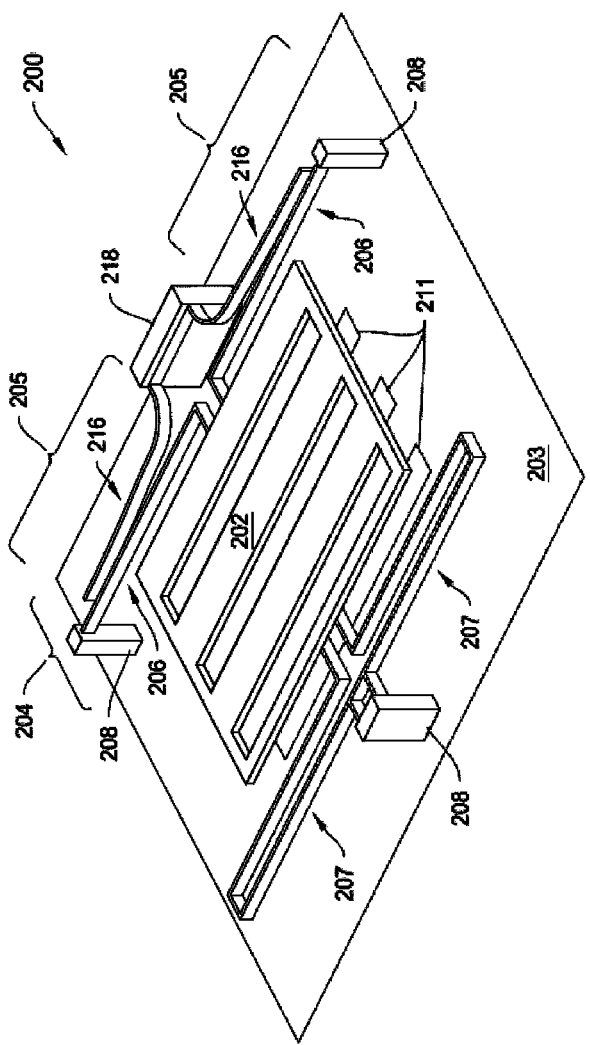
FIG. 2A shows an example perspective view of an illustrative shutter-based light modulator.

FIG. 2A shows a perspective view of an illustrative shutter-based light modulator 200. The shutter-based light modulator is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 204. If the substrate 204 is transparent, such as glass or plastic, then the aperture holes 211 are formed in a layer of light-blocking material deposited on the substrate 203. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 potential is removed, the load beams 206 push the shutter 202 back into its initial position, releasing the stress stored in the load beams 206.

A light modulator, such as light modulator 200, incorporates a passive restoring force, such as a spring, for returning a shutter to its rest position after voltages have been removed. Other shutter assemblies can incorporate a dual set of "open" and "closed" actuators and a separate sets of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
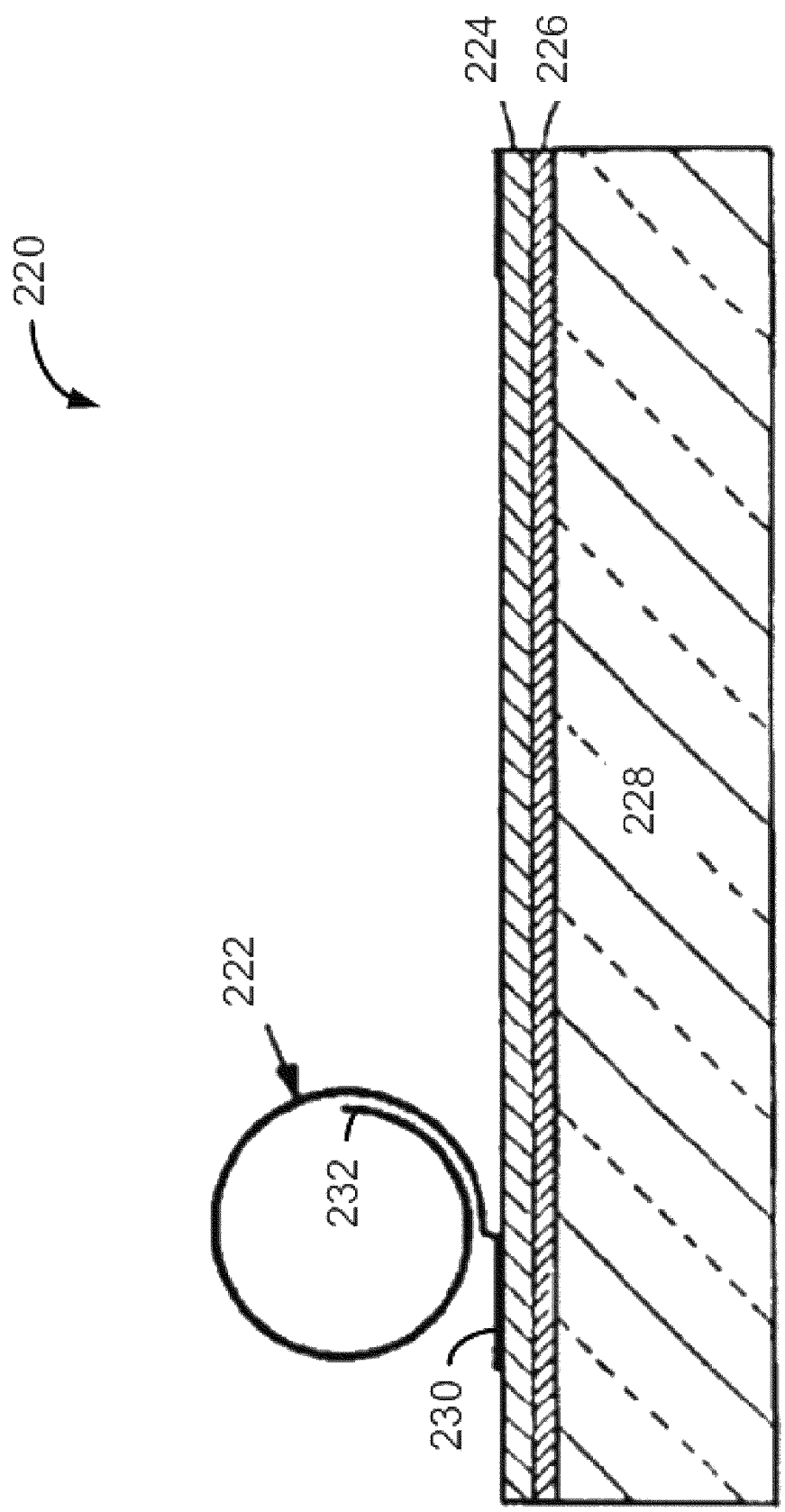
FIG. 2B shows a cross sectional view of a rolling actuator shutter-based light modulator.

The display apparatus 100, in alternative implementations, includes light modulators other than transverse shutter-based light modulators, such as the shutter assembly 200 described above. For example, FIG. 2B shows a cross sectional view of a rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

FIG. 2C shows a cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
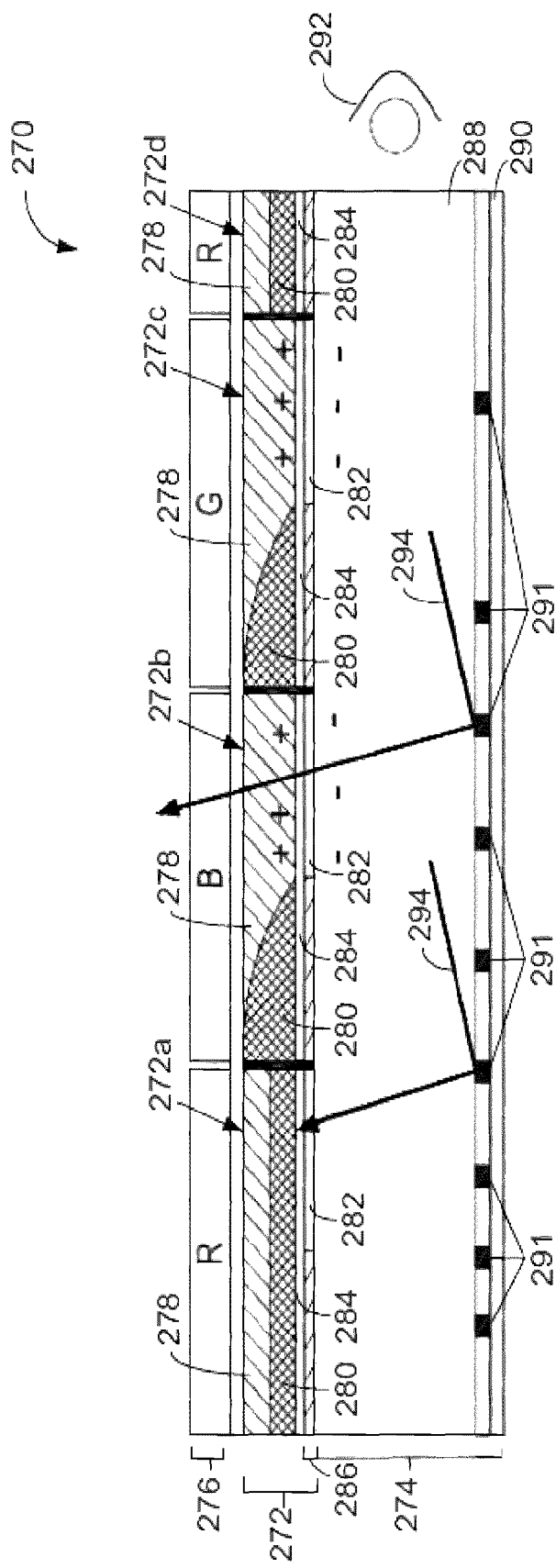
FIG. 2D shows a cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272*a-d* (generally "cells 272")

formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 290 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3A:
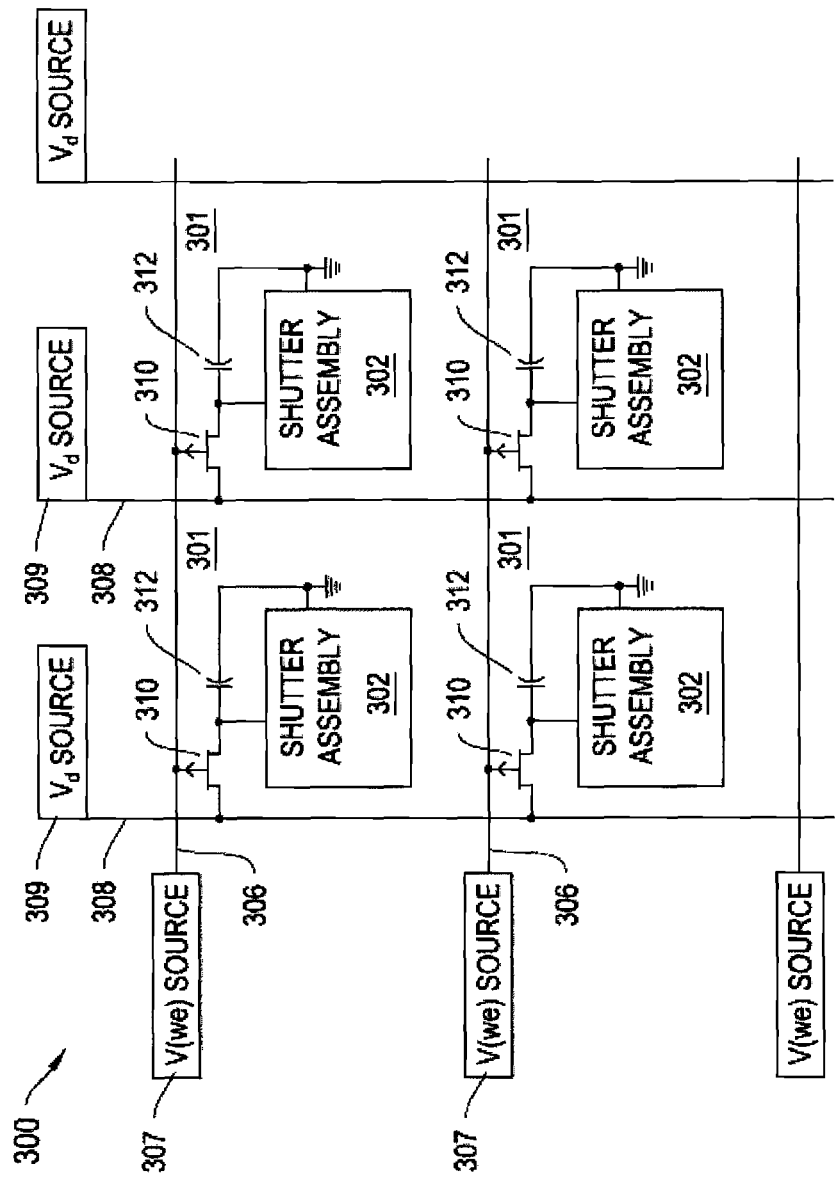
FIG. 3A shows an example schematic diagram of a control matrix.
Figure 3B:
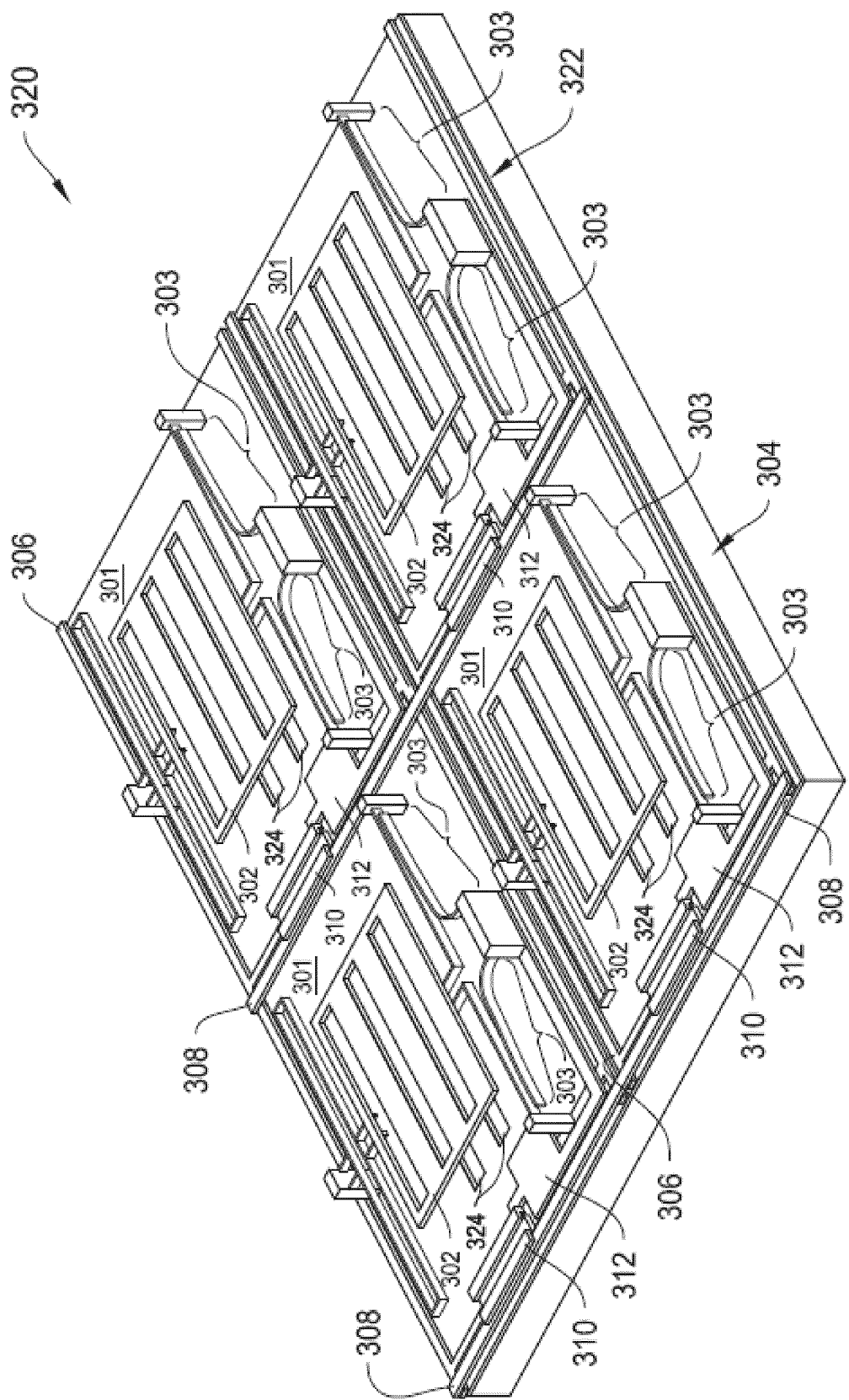
FIG. 3B shows a perspective view of an array of shutter-based light modulators connected to the control matrix of FIG. 3A.

FIG. 3A shows an example schematic diagram of a control matrix 300. The control matrix 300 is suitable for controlling the light modulators incorporated into the MEMS-based display apparatus 100 of FIG. 1A. FIG. 3B shows a perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (e.g., open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on' or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

Figure 4A:
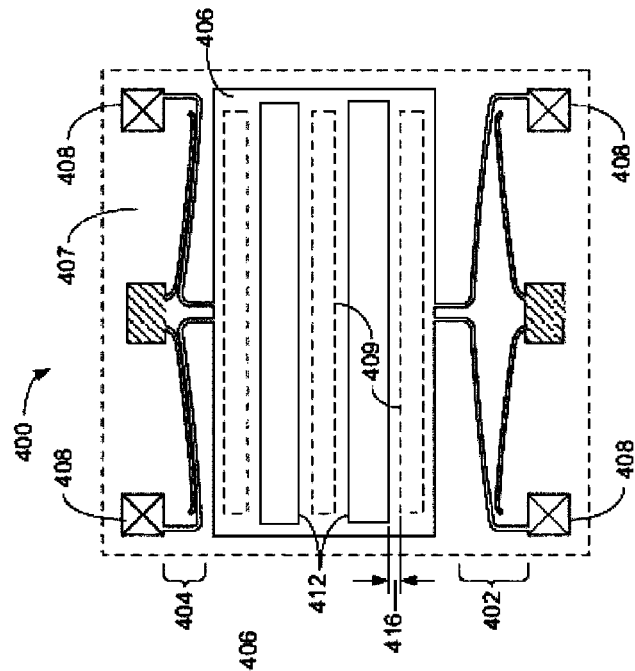
FIGS. 4A and 4B show example views of a dual actuator shutter assembly.
Figure 4B:
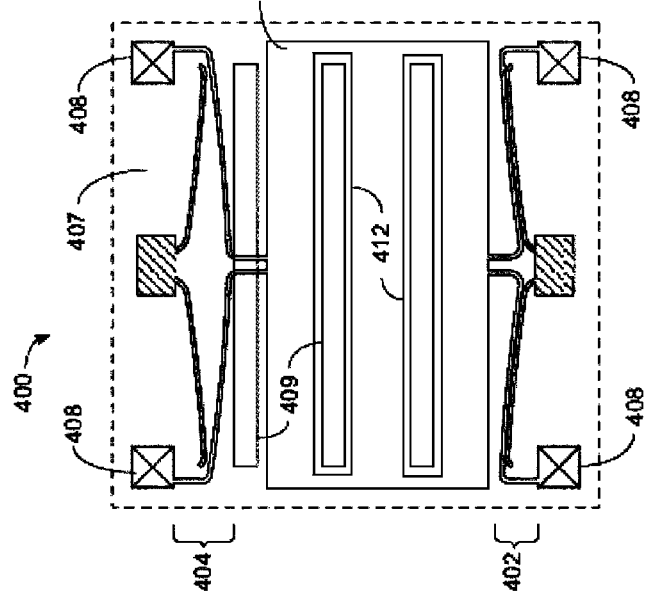

FIGS. 4A and 4B show example views of a dual actuator shutter assembly 400. The dual actuator shutter assembly, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
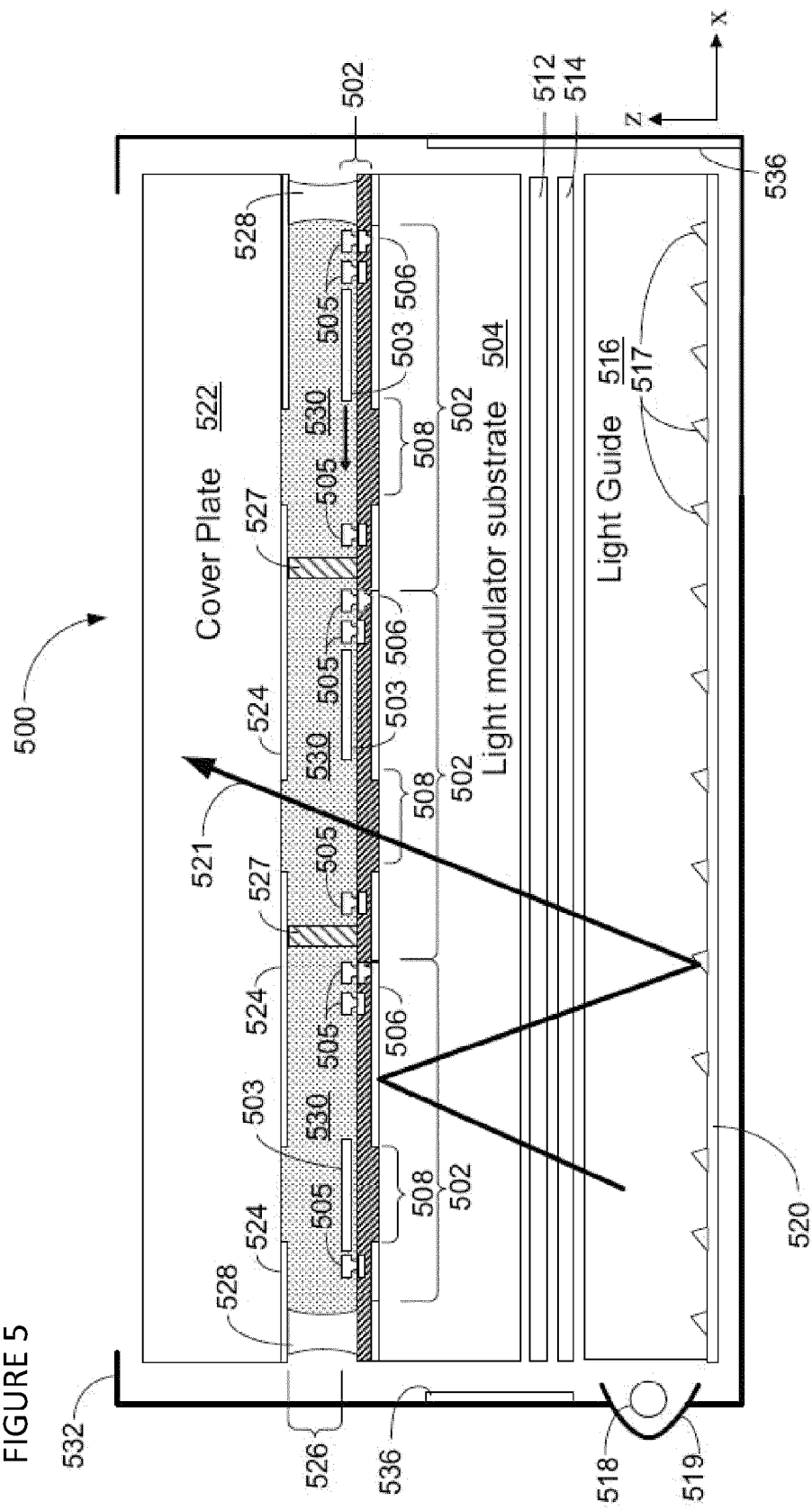
FIG. 5 shows an example cross sectional view of a display apparatus incorporating shutter-based light modulators.

FIG. 5 shows an example cross sectional view of a display apparatus 500 incorporating shutter-based light modulators (shutter assemblies) 502. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500.

The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror can be fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separates the substrate 504 from a planar light guide 516. The light guide includes a transparent, i.e., glass or plastic material. The light guide 516 is illuminated by one or more light sources 518, forming a backlight. The light sources 518 can be, for example, and without limitation, incandescent lamps, fluorescent lamps, lasers or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion, light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light sources 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps.

A cover plate 522 forms the front of the display apparatus 500. The rear side of the cover plate 522 can be covered with a light blocking layer 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid) and sealing the fluid (e.g., with an adhesive) within a fluid space or gap in a MEMS display cell. The fluid is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In order to reduce the actuation voltages, the liquid has a viscosity preferably below 70 centipoise, more preferably below 10 centipoise. Liquids with viscosities below 70 centipoise can include materials with low molecular weights: below 4000 grams/mole, or in some cases below 400 grams/mole. Suitable fluids 530 include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. And other fluids considered for these display assemblies include butyl acetate, dimethylformamide. Still other useful fluids for these displays include hydro fluoro ethers, perfluoropolyethers, hydro fluoro poly ethers, pentanol and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not depicted in FIG. 5 are electrical interconnects which provide control signals as well as power to the shutter assemblies 502 and the lamps 518.

In some other implementations, the roller-based light modulator 220, the light tap 250, or the electrowetting-based light modulation array 270, as depicted in FIGS. 2A-2D, as well as other MEMS-based light modulators, can be substituted for the shutter assemblies 502 within the display apparatus 500.

The display apparatus 500 is referred to as the MEMS-up configuration, wherein the MEMS based light modulators are formed on a front surface of substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e., the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6:
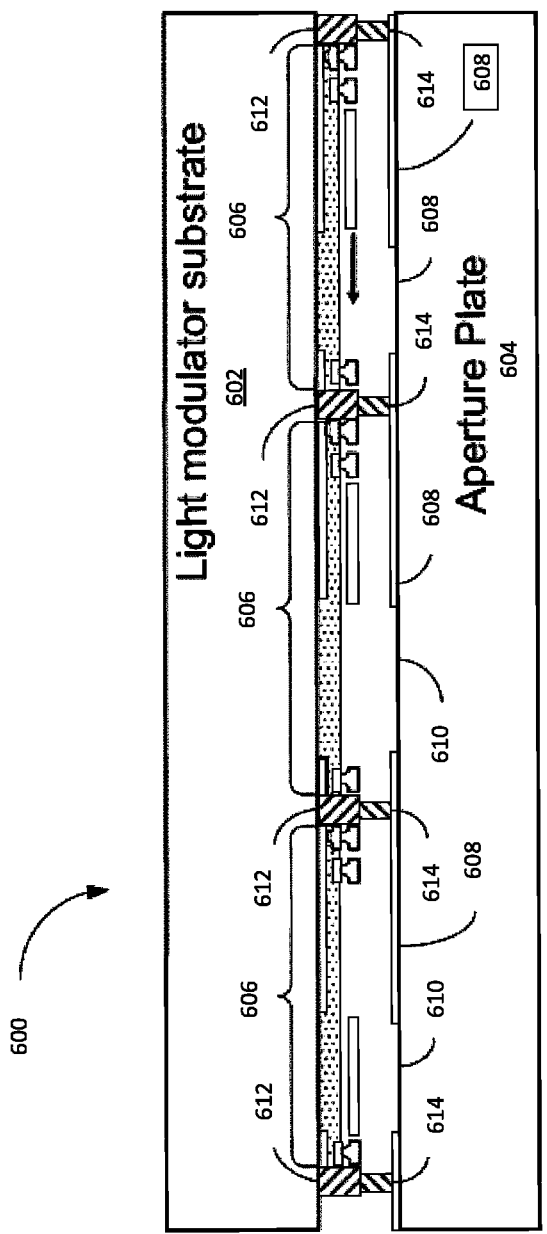
FIG. 6 shows a cross sectional view of a light modulator substrate and an aperture plate for use in a MEMS-down configuration of a display.

FIG. 6 shows a cross sectional view of a light modulator substrate and an aperture plate for use in a MEMS-down configuration of a display. The display assembly 600 includes a modulator substrate 602 and an aperture plate 604. The display assembly 600 also includes a set of shutter assemblies 606 and a reflective aperture layer 608. The reflective aperture layer 605 includes apertures 610. A predetermined gap or separation between the substrate 602 and 604 is maintained by the opposing set of spacers 612 and 614.

Display apparatus including MEMS shutter-based light modulators can be used to achieve 3D image generation without a viewer needing to wear glasses. To generate a 3D image, a display apparatus can be caused to form a left-eye image and a different right-eye image. A left-eye image is an image formed from light having an angular distribution weighted more heavily towards the right side of the display, and thus towards the left eye of a viewer. Conversely, a right-eye image is an image formed from light having an angular distribution weighted more heavily towards the left side of the display, and thus towards the right eye of a viewer. As used herein, a right-eye image or a left-eye image may refer to a full image frame or an image subframe output as part of a time-division multiplexing display process.

FIG. 7A shows an example display apparatus 700 that generates left-eye images and a right-eye images for viewing by a viewer 704. The display apparatus 700 includes a display surface 702 that has a right side 722 and a left side 724. The display surface 702 includes apertures through which light is directed towards the viewer 704. Light directed towards the right side 722 of the display and thus the left eye 706 of the viewer 704 forms left-eye images ("left-eye image light 711"). Light directed towards the left side of the display 724 and thus the right eye 708 of the viewer 704 forms right-eye images ("right-eye image light 713"). Light exiting the display forms an angle 714 with respect to an axis 725 of the display surface 702 that extends from the right side 722 to the second side 724 of the display apparatus 700. Light that is directed perfectly towards the right side 722 parallel to the display surface 702 forms a zero angle with the axis 725. Light directed perfectly towards the left side 724 parallel to the display surface 702 forms a 180 degree angle with the axis 725. As depicted in FIG. 7A, by light ray 712 corresponding to the mean intensity angle of the left-eye image light 711, the left-eye image light 711 forms a mean angle 714 with respect to the axis 725 that is less than 90 degrees. As depicted by the light ray 716, which corresponds to the mean intensity angle of the right-eye image light 713, the right-eye image light 713 forms a mean angle 718 with respect to the same axis of the display surface 702 that is greater than 90 degrees.

FIG. 7B shows an example diagram 750 of two curves indicating angular distribution of light that form left and right-eye images in the display apparatus 700 depicted in FIG. 7A. Referring to FIGS. 7A and 7B, a first curve 752 depicts an example angular distribution of the left-eye image light 711. A second curve 754 depicts an example angular distribution of the right-eye image light 713. Since light generally directed towards the left eye has an angle 714 of less than 90 degrees with respect to the axis 725 of the display surface 702, the angular distribution of the left-eye image light 711 is weighted more heavily at angles less than 90 degrees as indicated by the curve 752. Conversely, since light generally directed towards the right eye has an angle 718 of greater than 90 degrees with respect to the axis 725 of the display surface 702, the angular distribution of right-eye image light 713 is weighted more heavily at angles greater than 90 degrees, as indicated by the curve 754. The weighting does not have to be overly substantial to achieve its affect. A difference in peak intensity angles between the left-eye image light 711 and the right-eye image light 713 of about 1 degree is sufficient to induce some 3D perception in a viewer. In other words, a viewer can perceive an image as a 3D image if the peak intensity angle of a left-eye image is offset from the peak intensity angle of a right-eye image by about 1 degree. Accordingly, in some implementations, the display generates left-eye images having an angular intensity distribution with a peak intensity angle that is offset from the peak intensity angle of the right-eye image by about at least 1 degree. In some implementations, the offset between the peak intensity angles of left-eye and right-eye images is between about 1 degree and about degrees. In some other implementations, the offset between the peak intensity angles of left-eye and right eye images generated by the display is greater than about 5 degrees. In some other implementations, the display generates left-eye images that have an angular intensity distribution with a peak intensity at least 1 degree away from the display normal in a first direction and generates left-eye images that have an angular intensity distribution with a peak intensity at least 1 degree away from the display normal in a second, opposite direction. In some implementations, the angle of peak intensity of the right-eye and left-eye images are between about 1 and about 5 degrees away from the display normal in opposite directions. In some other implementations, the peak intensity angles of the left-eye images and right eye-images are greater than about 5 degrees away from the display normal.

Several architectures can be employed to generate three dimensional (3D) images using MEMS light modulators. Some architectures rely on a spatial multiplexing of two sets of light modulators. In some implementations using this architecture, a display relies on a relative positioning of the light blocking portions of a light blocking layer relative to apertures formed in an underlying aperture layer to generate distinct left-eye and right-eye images. In one such implementation, a first set of pixels are constructed such that light blocking portions of the light blocking layer overlap a respective first side of corresponding apertures formed in the aperture layer. Light travelling through these apertures and their corresponding apertures produces a first eye image. A second set of the pixels are constructed such that portions of the light blocking layer overlap respective second sides opposite to the first sides of corresponding apertures formed in the aperture layer. Light travelling through these apertures and their corresponding apertures produces a second eye image. Examples of such implementations are described further below with respect to FIGS. 9 and 10.

A second set of implementations constructed according to a spatial multiplexing architecture relies on the use of optical elements to generate distinct left-eye and right-eye images. In one such implementation, a first set of pixels includes optical elements that are configured to redirect light such that the light transmitted by the pixels has an angular distribution weighted more heavily towards a first side of the display apparatus, and thereby a first eye of a viewer. A second set of pixels includes optical elements that are configured to redirect light such that the light transmitted by the pixels has an angular distribution weighted more heavily towards second side of the display apparatus, and thereby a second eye of the viewer. Examples of such implementations are described further with respect to FIGS. 11 and 12.

A third set of implementations adhering to a spatial multiplexing architecture relies on a degree of overlap that exists between light blocking portions of a shutter and corresponding apertures formed in an underlying aperture layer when the shutters are in an open position. In one such implementation, shutters of a first set of MEMS shutter-based pixels are configured to produce a first eye image by, when entering the open state, being driven to a position where a light blocking portion of each shutter partially overlaps a first side of a corresponding aperture formed in the aperture layer. Shutters of a second set of MEMS shutter-based pixels are configured to produce a second eye image by, when entering the open state, being driven to a position where a light blocking portion of the shutter partially overlaps a second side of a corresponding aperture formed in the aperture layer. An example of such an implementation is described below with respect to FIG. 13.

Displays in the first set and second set of implementations described above create the spatial multiplexing of two sets of pixels, including for example, MEMS shutter-based pixels based on the fixed structural differences between the sets of pixels. In contrast, displays in the third set of implementations can be created by dynamic operation of the device. That is, shutters can be configured to be driven into multiple positions creating different overlaps or no overlaps at all. As a result, such displays can create also 3D images via temporal multiplexing of MEMS shutter-based pixels. That is, in some implementations, displays in the third set of implementations mentioned above may be configured to alternately use the same set of pixels to produce both first eye images and second eye images.

FIG. 8A shows an example portion of a display 802. The display 802 includes an array of pixels arranged in a spatial multiplexing arrangement. The arrangement identifies, for each pixel, which of two images, a left-eye image (shown as L) or a right-eye image (shown as R) the pixel contributes to. In the display 802, left eye image pixels and right-eye image pixels are arranged in a "checkerboard" fashion, i.e., alternating every row and column. In some implementations, the pixels assigned to generate the left-eye image may be reversed to generate a right-eye image while pixels assigned to generate the right-eye image may be reversed to generate a left-eye image after every image frame.

FIG. 8B shows another example portion of a display 852. The display 852 includes an array of pixels arranged in another spatial multiplexing arrangement The arrangement identifies, for each pixel, which of two images, a left-eye image (shown as L) or a right-eye image (shown as R) the pixel contributes to. In the display 852, left-eye image pixels and right eye image pixels are arranged in a "striped" fashion, i.e., alternating every column. Similarly, the pixels could alternate every row. In some implementations, the pixels assigned to generate the left-eye image may be reversed to generate a right-eye image while pixels assigned to generate the right-eye image may be reversed to generate a left-eye image after every image frame.

FIG. 8C shows an example portion of a display 862 at two points in time. The display 862 operates according to a temporal multiplexing process to form 3D images. As with FIGS. 8A and 8B, each pixel in FIG. 8C is labeled with an L or R indicating whether the pixel is contributing to a left-eye image or a right-eye image. As shown, at a time t=1, all pixels in the portion of the display 862 are assigned to display the left-eye image. At time t=2, the same pixels in the portion of the display 862b are assigned to display a right-eye image. In some implementations, the pixels can be assigned to alternate between displaying left-eye images L and right-eye images R every frame. In this way, the controller can temporally multiplex left and right-eye images on the display using the same pixels of the display. In some implementations, the pixels may display left-eye images and right-eye images according to a subframe sequence. The subframe sequence may be arranged such that left-eye images and right-eye images are displayed in an alternating manner.

Figure 9:
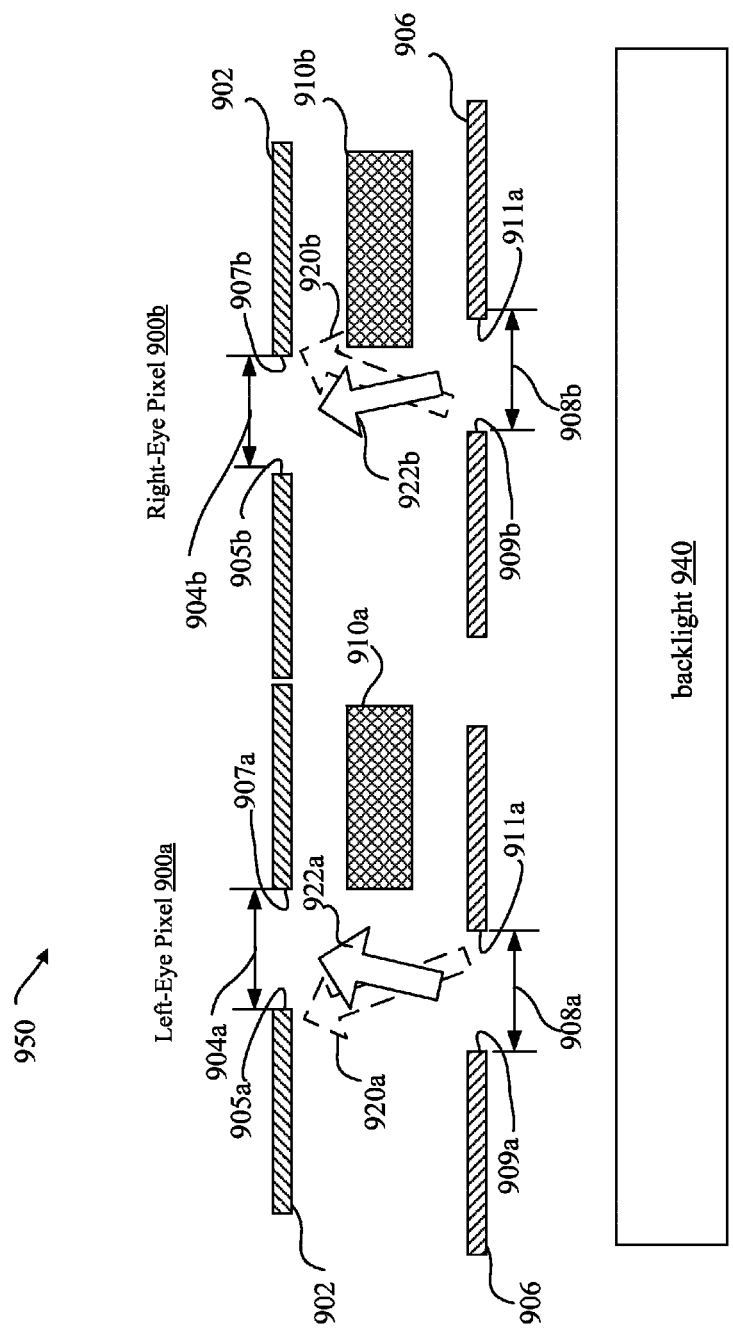
FIGS. 9-12 show example display apparatus including two pixels.

FIG. 9 shows an example display apparatus 950 including two pixels 900a and 900b. The display apparatus 950 creates a spatial multiplexing between pixels by varying overlaps between light blocking portions of a light blocking layer and corresponding aperture layer apertures formed in an underlying aperture layer.

The display apparatus 950 includes a front aperture layer deposited on a front substrate of the display apparatus 950 that includes a light blocking layer 902 having a light blocking material, an aperture layer 906 including layers of reflective and light absorbing material and a backlight 940. Both pixels 900a and 900b include corresponding front apertures 904a and 904b formed in the light blocking layer 902, aperture layer apertures 908a and 908b formed in the aperture layer 906 and shutters 910a and 910b positioned between the light blocking layer 902 and the aperture layer 906. The shutters 910a and 910b are driven left to right or right to left, parallel to the light blocking layer 902 and the aperture layer 906 to selectively block the aperture layer apertures 908a and 908b, thereby modulating light from the backlight 940 to form an image.

Each aperture layer aperture is defined by a first edge and a second edge opposite the first edge. For example, the aperture layer aperture 908a is defined by a first left edge 909a and a first right edge 911a. Similarly, the aperture layer aperture 908b is defined by a second left edge 909b and a second right edge 911b of the aperture layer 906. Each front aperture 904a and 904b, likewise, is defined by a first edge and a second edge opposite the first edge. For example, the front aperture 904a is defined by a first left edge 905a and a first right edge 907a. Similarly, the front aperture 904b is defined by a second left edge 905b and a second right edge 907b. In general, the front apertures 904a and 904b and the aperture layer apertures 908a and 908b have lengths between a respective top side and bottom side that is longer than their corresponding widths between a left side and a right side.

Each of the front apertures 904a and 904b is positioned relative to its corresponding aperture layer aperture 908a and 908b, respectively, such that a portion of the light blocking material overlaps the corresponding aperture layer apertures 908a and 908b. Specifically, the left edge 905a of the front aperture 904a is offset with respect to the left edge 909a of the aperture layer aperture 908a in a first direction such that the light blocking material partially overlaps the left-most portion of the aperture layer aperture 908a. The right edge 907a of the front aperture 904a is offset with respect to the right edge 911a of the aperture layer aperture 908a in the same direction, thereby causing the front aperture 904a to be misaligned towards the first direction with respect to the aperture layer aperture 908a. For pixels intended to provide a left-eye image, such as pixel 900a, the partial overlap of the light blocking layer 902 with respect to the aperture layer aperture 908a alters the angular distribution of light passing through the corresponding apertures 904a and 908a toward the left eye or the right side of the display apparatus 950 (the right side of the Figure). Light 920a angled substantially away from the left eye is blocked by the light blocking material beside the left edge 905a of the front aperture 904a. However, light 922a angled towards the left eye can pass through the aperture layer aperture 908a and the front aperture 904a without obstruction.

Similarly, the right edge 907b of the front aperture 904b is offset with respect to the right edge 911b of the aperture layer aperture in a second direction opposite the first direction such that the light blocking material overlaps the right-most portion of the aperture layer aperture 908b. The left edge 905b of the front aperture 904b is offset with respect to the left edge 909b of the aperture layer aperture 908b in the second direction also, thereby causing the front aperture 904a to be misaligned towards the second direction with respect to the aperture layer aperture 908a. For pixels intended to provide a right-eye image, such as the pixel 900b, the partial overlap of the light blocking layer 902 with respect to the aperture layer aperture 908b alters the angular distribution of light passing through the corresponding apertures 904b and 908b toward the right eye or the left side of the display apparatus 950 (the left side of the Figure). Light 920b angled substantially away from the right eye is blocked by the light blocking layer beside the right edge 907b of the front aperture 904b. However, light 922b angled towards the right eye can pass through the aperture layer aperture 908b and the front aperture 904b without obstruction.

Figure 10:
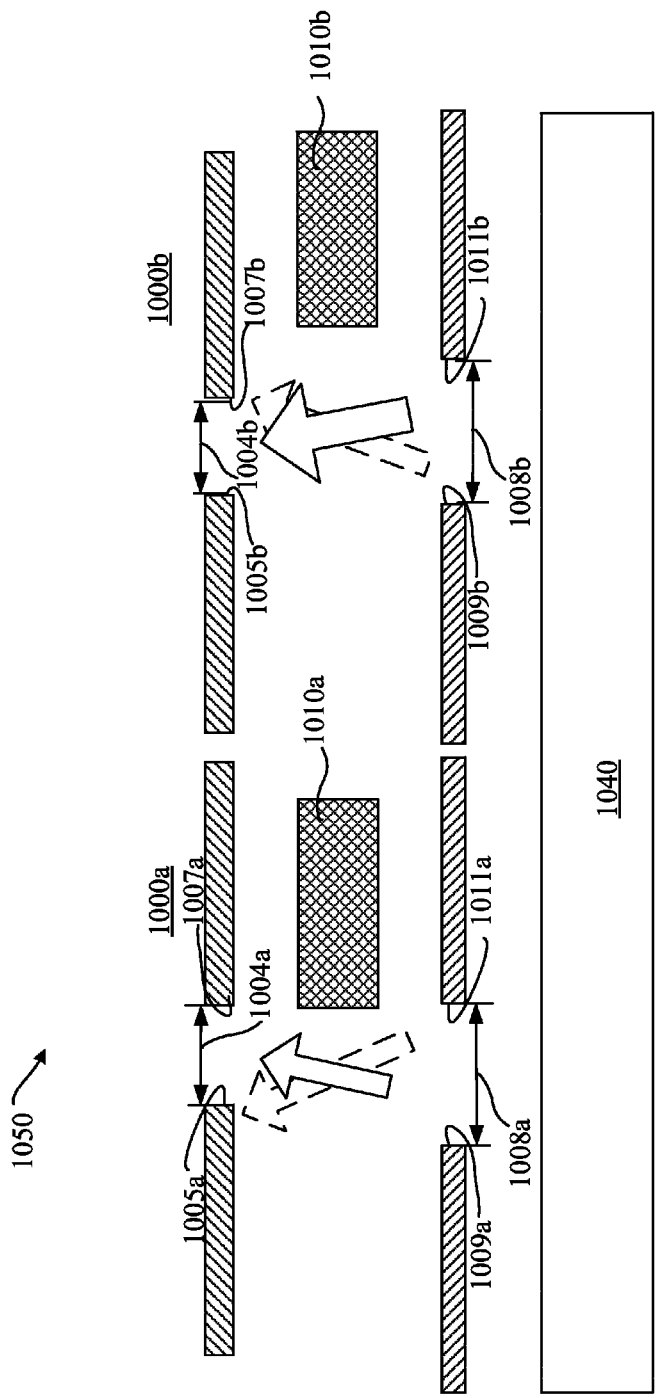

FIG. 10 shows an example display apparatus 1050 including two pixels 1000a and 1000b. Similar to the display apparatus 950 in FIG. 9, the display apparatus 1050 creates a spatial multiplexing between pixels by varying overlaps between light blocking portions of a light blocking layer and corresponding aperture layer apertures formed in an underlying aperture layer.

The display apparatus 1050 includes a front aperture layer deposited on a front substrate of the display apparatus 1050 that includes a light blocking layer 1002 having a light blocking material, an aperture layer 1006 including layers of reflective and light absorbing material and a backlight 1040. Both pixels 1000a and 1000b include corresponding front apertures 1004a and 1004b formed in the light blocking layer 1002, aperture layer apertures 1008a and 1008b formed in the aperture layer 1006 and shutters 1010a and 1010b positioned between the light blocking layer 1002 and the aperture layer 1006. The shutters 1010a and 1010b are driven left to right or right to left, parallel to the light blocking layer 1002 and the aperture layer 1006 to selectively block the aperture layer apertures 1008a and 1008b, thereby modulating light from the backlight 1040 to form an image.

Each aperture layer aperture 1008a and 1008b is defined by a first edge and a second edge opposite the first edge. For example, the aperture layer aperture 1008a is defined by a first left edge 1009a and a first right edge 1011a. Similarly, the aperture layer aperture 1008b is defined by a second left edge 1009b and a second right edge 1011b. Each front aperture 1004a and 1004b, likewise, is defined by a first edge and a second edge opposite the first edge. For example, the front aperture 1004a is defined by a first left edge 1005a and a first right edge 1007a. Similarly, the front aperture 1004b is defined by a second left edge 1005b and a second right edge 1007b.

Each of the front apertures 1004a and 1004b is positioned relative to its corresponding aperture layer aperture 1008a and 1008b, respectively, such that a portion of the light blocking layer overlaps the corresponding aperture layer apertures 1008a and 1008b. Specifically, the left edge 1005a of the front aperture 1004a is offset with respect to the left edge 1009a of the aperture layer aperture 1008a in a first direction such that the light blocking layer overlaps the left-most portion of the aperture layer aperture 1008a. The right edge 1007a of the front aperture 1004a is substantially aligned with the right edge 1011a of the aperture layer aperture 1008a. As a result, the front aperture 1004a is smaller than the aperture layer aperture 1008a. In the pixel 1000a, the center of the front aperture 1004a is offset with respect to the center of the aperture layer aperture 1008a in a direction towards the right side of the display or the left eye of a viewer. For pixels intended to provide a left-eye image, such as the pixel 1000a, the partial overlap of the light blocking layer 1002 with respect to the aperture layer aperture 1008a alters the angular distribution of light passing through the corresponding apertures 1004a and 1008a towards the left eye or the right side of the display apparatus 1050. Light 1020a angled substantially away from the left eye is blocked by the light blocking layer beside the left edge 1005a of the front aperture 1004a. However, light 1022a angled towards the left eye can pass through the aperture layer aperture 1008a and the front aperture 1004a with less obstruction.

Similarly, for pixels intended to generate right-eye images, such as the pixel 1000b, the right edge 1007b of the front aperture 1004b is offset with respect to the right edge 1011b of the aperture layer aperture 1008b in a second direction opposite the first direction such that the light blocking layer overlaps the right-most portion of the aperture layer aperture 1008b. The left edge 1005b of the front aperture 1004b is substantially aligned with the right edge 1009b of the aperture layer aperture 1008b. As a result, the front aperture 1004b is smaller than the aperture layer aperture 1008b. In the pixel 1000b, the center of the front aperture 1004b is offset with respect to the center of the aperture layer aperture 1008b in a direction towards the left side of the display or the right eye of a viewer. The partial overlap of the light blocking layer 1002 with respect to the aperture layer aperture 1008b alters the angular distribution of light passing through the corresponding apertures 1004b and 1008b towards the right eye or the left side of the display apparatus 1050. Light 1020b angled substantially away from the right eye is blocked by the light blocking layer beside the right edge 1007b of the front aperture 1004b. However, light 1022b angled towards the right eye can pass through the aperture layer aperture 1008b and the front aperture 1004b with less obstruction. The result, as with the partial overlap used in the pixels 900a and 900b of FIG. 9, is a differential weighting of the angular distribution of light passing through the right-eye pixels versus left-eye pixels, as light having an angle substantially away from the intended eye is absorbed by the overlapping portion of the light blocking layer 1004.

Figure 11:
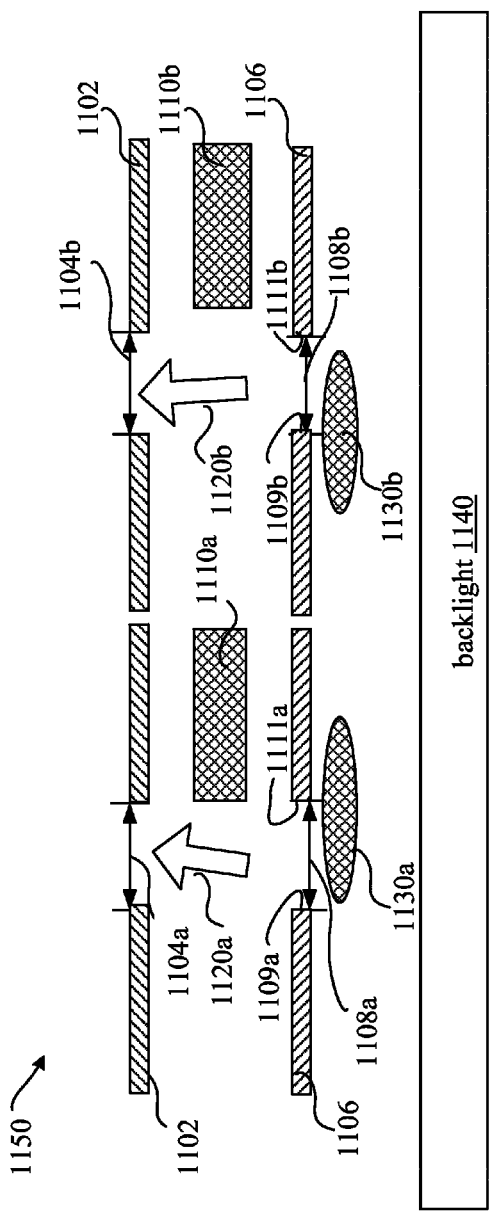
Figure 12:
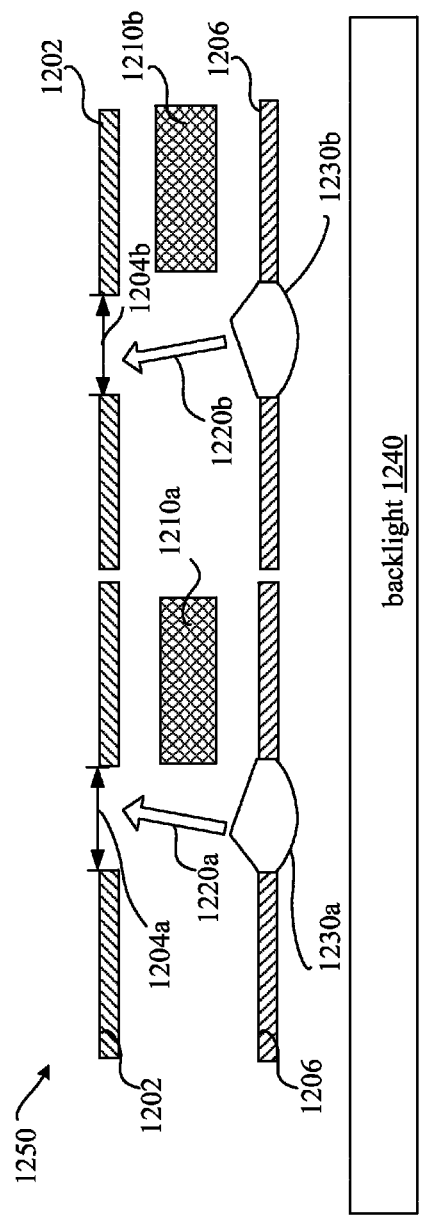

As described above, FIGS. 9 and 10 show display apparatus that rely on a relative positioning of a light blocking light blocking layer relative to apertures formed in an aperture layer to generate 3D images. FIGS. 11 and 12, as will be described below, show display apparatus that rely on the use of optical elements to generate 3D images.

FIG. 11 shows an example display apparatus 1150 including two pixels 1100*a* and 1100*b*. The display apparatus 1150 creates a spatial multiplexing between pixels by using optical elements to redirect light to pass through corresponding apertures formed in pixels of the display apparatus.

The display apparatus 1150 includes a front aperture layer deposited on a front substrate of the display apparatus 1150 that includes a light blocking layer 1102 having a light blocking material, an aperture layer 1106 including layers of reflective and light absorbing material and a backlight 1140. Both pixels 1100*a* and 1100*b* include corresponding front apertures 1104*a* and 1104*b* formed in the light blocking layer 1102, aperture layer apertures 1108*a* and 1108*b* formed in the aperture layer 1106 and shutters 1110*a* and 1110*b* positioned between the light blocking layer 1102 and the aperture layer 1106. The shutters 1110*a* and 1110*b* are driven left to right or right to left, parallel to the light blocking layer 1102 and the aperture layer 1106 to selectively block the aperture layer apertures 1108*a* and 1108*b*, thereby modulating light from the backlight 1140 to form an image. In contrast to the pixels 900*a* and 900*b* of FIGS. 9 and 1000*a* and 1000*b* of FIG. 10, the aperture layer apertures 1108*a* and 1108*b* formed in the aperture layer 1108 and the front apertures 1104*a* and 1104*b* formed in the light blocking layer 1104 may be substantially aligned on both sides.

In addition, the pixels 1100*a* and 1100*b* include respective de-centered optical elements 1130*a* and 1130*b* that may be positioned between the aperture layer 1106 and the back light 1140 for forming left eye and right-eye images, respectively. The de-centered optical elements 1130*a* and 1130*b* are configured to provide a similar differential angular distribution of light from left-eye and right-eye pixels as described above with respect to FIGS. 9 and 10. In contrast to the use of partial overlaps between the front apertures and the aperture layer apertures as detailed in those Figures, the display apparatus 1150 can increase the amount of light being angled towards the desired direction and passing through the respective aperture layer apertures 1108*a* and 1108*b* and the front apertures 1104*a* and 1104*b*. In some implementations, the de-centered optical elements are positioned between the aperture layer 1106 and the backlight 1140. In such implementations, some of the light that is not being redirected through the corresponding aperture layer apertures 1108*a* and 1108*b* in the desired range of angles can be redirected towards a light reflecting bottom surface of the aperture layer 1106 that is adjacent to the backlight 1140. In this way, such light can be reflected back into, and recycled by, the backlight. This allows more light to eventually escape the display apparatus 1150 to form brighter images or consume less power.

For pixels intended to generate left-eye images, such as the pixel 1100*a*, the pixel 1100*a* includes the de-centered optical element 1130*a* that is positioned between the backlight 1140 and the aperture layer aperture 1108*a*. The de-centered optical element 1130*a* may be positioned closer towards one edge of the aperture layer aperture 1108*a* relative to an opposite edge of the aperture layer aperture 1108*a* based on the direction in which the light is to be redirected. In this case, the de-centered optical element 1130*a* is positioned closer to a first edge 1111*a* of the aperture layer aperture 1108*a* than a second edge 1109*a* of the aperture layer aperture 1108*a*. Light from the backlight 1140 passes through the de-centered optical element 1130*a* and is redirected such that the light 1120*a* passing through the aperture layer aperture 1108*a* and the front aperture 1104*a* has an angular distribution weighted more heavily towards the left eye of a viewer or the right side of the display apparatus 1150.

Conversely, for pixels intended to generate right-eye images, such as the pixel 1100*b*, the de-centered optical element 1130*b* is positioned between the backlight 1140 and the aperture layer aperture 1108*b*. The de-centered optical element 1130*b* may be positioned closer towards one edge of the aperture layer aperture 1108*b* relative to an opposite edge of the aperture layer aperture 1108*b* based on the direction in which the light is to be redirected. In this case, the de-centered optical element 1130*b* is positioned closer to a first edge 1109*b* of the aperture layer aperture 1108*b* than a second edge 1111*b* of the aperture layer aperture 1108*b*. Light from the backlight 1140 passes through the de-centered optical element 1130*b* and is redirected such that the light 1120*b* passing through the aperture layer aperture 1108*b* and the front aperture 1104*b* has an angular distribution weighted heavily towards the right eye of the viewer or the left side of the display apparatus 1150.

In some implementations, the de-centered optical elements 1130*a* and 1130*b* include one or more of a de-centered lens, prism, or other optical element that adjusts the angular distribution of light passing through the corresponding apertures. In some such implementations that use de-centered optical elements, the front apertures 1104*a* and 1104*b* may be offset relative to the aperture layer apertures 1108*a* and 1108*b* similar to the configurations of the display apparatus 950 and 1050 shown in FIGS. 9 and 10, respectively.

FIG. 12 shows an example display apparatus 1250 including two pixels 1200*a* and 1200*b*. Similar to the display apparatus 1150 in FIG. 11, the display apparatus 1250 creates a spatial multiplexing between pixels by using optical elements to redirect light to pass through corresponding apertures formed in pixels of the display apparatus.

The display apparatus 1250 includes a front aperture layer deposited on a front substrate of the display apparatus 1250 that includes a light blocking layer 1202 having a light blocking material, an aperture layer 1206 including layers of reflective and light absorbing material and a backlight 1240. Both pixels 1200*a* and 1200*b* include corresponding front apertures 1204*a* and 1204*b* formed in the light blocking layer 1202 and shutters 1210*a* and 1210*b* positioned between the light blocking layer 1202 and the aperture layer 1206. The pixels 1200*a* and 1200*b* also include respective optical elements 1230*a* and 1230*b* positioned within aperture layer apertures (not shown) formed in the aperture layer 1206. The respective optical elements 1230*a* and 1230*b* are configured to provide differential angular distribution of light for the pixels 1200*a* and 1200*b*. In some implementations, the optical elements 1230*a* and 1230*b* may include one or more microlenses integrated into the aperture layer 1206 substantially filling the aperture layer apertures 1208*a* and 1208*b*. The optical elements 1230*a* and 1230*b* direct light towards the right or left eye depending on the shape or orientation of the optical elements.

For pixels intended to generate left-eye images, such as the pixel 1200*a*, the optical element 1230*a* is fitted to the aperture layer 1206. Light 1220*a* from the backlight 1240 passes through the optical element 1230*a* and is redirected such that the light 1220*a* has an angular distribution weighted more heavily towards the left eye of a viewer or the right side of the display apparatus 1250. Conversely, for pixels intended to generate right-eye images, such as the pixel 1200b, the optical element 1230b is fitted to the aperture layer 1206. Light 1220b from the backlight 1240 passes through the optical element 1230b and is redirected such that the light 1220b has an angular distribution weighted more heavily towards the right eye of the viewer or the left side of the display apparatus 1250.

Figure 13:
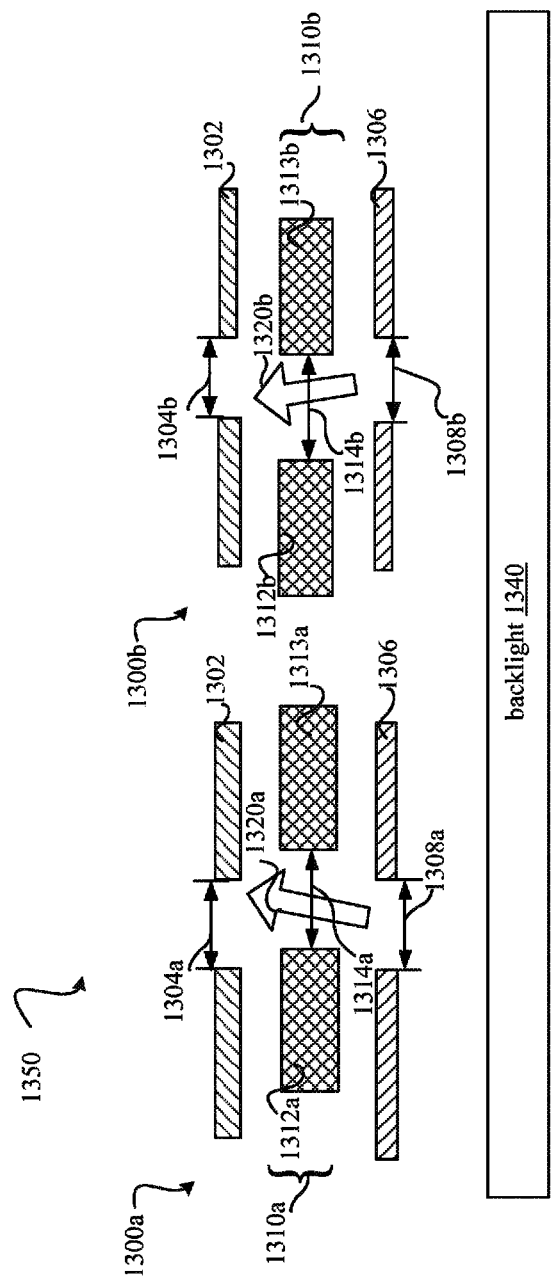
FIG. 13 shows an example display apparatus including two pixels to form 3D images.

FIG. 13 shows an example display apparatus 1350 including two pixels 1300a and 1300b to form 3D images. The display apparatus 1350, similar to the display apparatus shown with respect to FIGS. 9-12 may rely on the spatial multiplexing of two sets of pixels. In particular, in some implementations, the display apparatus 1350 relies on the spatial multiplexing of MEMS-shutter based light modulators. However, in contrast to the display apparatus depicted in FIGS. 9-12, the display apparatus 1350 relies on the degree of overlap between light blocking portions of shutters and corresponding apertures formed in an underlying aperture layer when the shutters are in an open position to generate 3D images.

The display apparatus 1350 includes a front aperture layer deposited on a front substrate of the display apparatus 1350 that includes a light blocking layer 1302 having a light blocking material, an aperture layer 1306 including layers of reflective and light absorbing material and a backlight 1340. Both pixels 1300a and 1300b include corresponding front apertures 1304a and 1304b formed in the light blocking layer 1302 and corresponding aperture layer apertures 1308a and 1308b formed in the aperture layer 1306.

Each of the pixels also includes a corresponding shutter 1310a or 1310b. As depicted in FIG. 13, the shutters 1310a and 1310b are slotted, similar to the shutter 202 shown in FIG. 2. The shutters 1310a and 1310b include first light blocking portions 1312a and 1312b and second light blocking portions 1313a and 1313b, which are separated by shutter apertures 1314a and 1314b, respectively. The shutters 1310a and 1310b are configured to be driven by a display controller, such as the display controller 134 depicted in FIG. 1.

To provide the differential weighting to the angular distribution of light passing through corresponding apertures of a pixel, the first light blocking portions 1312a and 1312b and second light blocking portions a 1313a and 1313b are driven to distinct positions. To generate left-eye images, the shutter 1310a is driven to an open position such that the first light blocking portion 1312a overlaps a portion of the corresponding aperture layer aperture 1308a. To generate right-eye images, the shutter 1310b is driven to an open position such that the second light blocking portion 1313b overlaps a different portion of the corresponding aperture layer aperture 1308b.

Specifically, for the left eye pixel 1300a configured to generate left-eye images, the shutter 1310a moves between a closed position and a left-eye open position. In the closed position, the light blocking portion 1313a overlaps the entire aperture layer aperture 1308a. In the left-eye open position, the light blocking portion 1313a does not overlap any portion of the aperture layer portion 1308a, but the light blocking portion 1312a overlaps the left-most portion of the aperture layer aperture 1308a such that light angled away from the left eye is blocked by the light blocking portion 1312a. Assuming the shutter 1310a opens by being driven from the left side of the display apparatus 1350 to the right side of the display apparatus 1350, the shutter 1310a can be considered to be in an "over-driven" position, i.e., it's driven beyond a neutral open position.

For the right eye pixel 1300b configured to generate right-eye images, the shutter 1310b moves between a closed position and a right-eye open position. In the closed position, the light blocking portion 1312b overlaps the entire aperture layer aperture 1308b. In the right-eye open position, the light blocking portion 1312b does not overlap any portion of the aperture layer portion 1308b but the light blocking portion 1313b overlaps the right-most portion of the aperture layer aperture 1308b. In this way, light angled away from the right eye is blocked by the light blocking portion 1312b. Assuming the shutter 1310b opens by being driven from the left side of the display apparatus 1350 to the right side of the display apparatus 1350, the shutter 1310b can be considered to be in an "under-driven" position, i.e., it is not driven far enough to reach a neutral open position.

To generate a 3D image using the display apparatus 1350, a display controller of the shutter-based display apparatus 1350 is configured to cause a first set of MEMS shutter-based pixels that include the pixel 1300a to form a left-eye image and a second set of MEMS shutter-based pixels that include the pixel 1300b to form a right-eye image. In implementations that rely on the spatial multiplexing of the two sets of MEMS shutter-based pixels, the display controller can drive the first set of pixels between a closed position and a left-eye open position and drive the second set of pixels between the closed position and a right-eye open position. In particular, to generate a left-eye image, shutters, such as shutter 1310a, of the first set of MEMS shutter-based pixels are driven to the left eye open position that disproportionately allows light angled towards the left eye of a viewer or the right side of the display apparatus 1350 to pass through the apertures (i.e., the aperture layer apertures, shutter apertures and front apertures) while disproportionately blocking light angled away from the left eye of the viewer. Similarly, to generate a right-eye image, shutters, such as the shutter 1310b, of the second set of MEMS shutter-based pixels are driven to the right-eye open position that disproportionately allows light angled towards the right eye of the viewer or the left side of the display apparatus 1350 to pass through the corresponding apertures of the display apparatus while disproportionately blocking light angled away from the right eye of the viewer. In some implementations, pixels 1300a and 1300b include optical elements similar to optical elements 1130a and 1130b depicted in FIG. 11 or optical elements 1230a and 1230b depicted in FIG. 12. Such optical elements promote light passing through the aperture layer apertures 1308a and 1308b to have angles more likely to pass through the shutter apertures 1314a and 1314b.

Although the first set of implementations described above with respect to FIGS. 9 and 10 and second set of implementations described above with respect to FIGS. 11 and 12 relate to architectures that rely on the spatial multiplexing of two sets of pixels to generate 3D images, the third set of such implementations described above with respect to FIG. 13 may alternatively be configured to implement temporal multiplexing of one or more sets of MEMS shutter-based pixels or other light modulators to form a 3D image.

In particular, each of the MEMS shutter-based pixels of display apparatus 1350 may be configured to produce a right-eye image at a first time and a left-eye image at a second time. This is possible because the pixels 1300a and 1300b may be identical. In such implementations, the controller is configured to drive the shutters, such as shutters 1310a and 1310b, of the pixels, such as pixels 1300a and 1300b, between at least three positions, namely, the closed position, the left-eye open position and the right-eye open position. This can be effectuated by altering the voltages applied to the actuators that control the positions of shutters. For example, in some implementations, by applying an incrementally lower drive voltage, such as 23 volts, to an actuator controlling the shutter 1310a, the shutter 1310a moves from the closed position to the right eye open position, i.e., the under-driven position. Applying an incrementally higher voltage, such as 27 volts, to the same actuator, moves the shutter 1310a from the closed position to the left eye open position, i.e., the over-driven position.

In some implementations, each of the display apparatus 950, 1050, 1150, 1250 and 1350 of FIGS. 9-13 can be configured to form both 2D images and 3D images. For display apparatus implementing spatial multiplexing to form 3D images, such display apparatus generate 2D images by having the left and right eye pixels output identical images. In some implementations of the display apparatus 1350 depicted in FIG. 13, the shutter-based light modulators, e.g., shutters 1310a and 1310b, can be driven into at least four distinct positions, namely, the closed position, the left-eye open position, the right-eye open position and a neutral open position. In the neutral open position, the shutter aperture, for example, shutter aperture 1314a, is fully aligned with the aperture layer aperture 1308a such that the shutter aperture 1314a is centered on the aperture layer aperture 1308a. In this way, the shutter 1310a allows an even angular distribution of light to pass through the aperture layer aperture 1308a, the shutter aperture 1312a and the front aperture 1304a. Following the example described above, by applying a voltage between the incrementally lower voltage and the incrementally higher voltage, such as 25 volts, the shutter 1310a can move from the closed position to the neutral open position.

It should be appreciated that the implementations described above with respect to FIGS. 9-13 show portions of a display apparatus in a MEMS down configuration as described with respect to FIG. 6. The implementations described herein also can be implemented in a MEMS up configuration, which is described in further detail with respect to FIG. 5. Generally, in a MEMS up display apparatus, the light blocking layer is separate from the back plane and instead applied on a cover sheet. The back plane is formed on a MEMS substrate that is behind the cover sheet and the aperture layer is placed between the MEMS substrate and the backlight.

Figure 14:
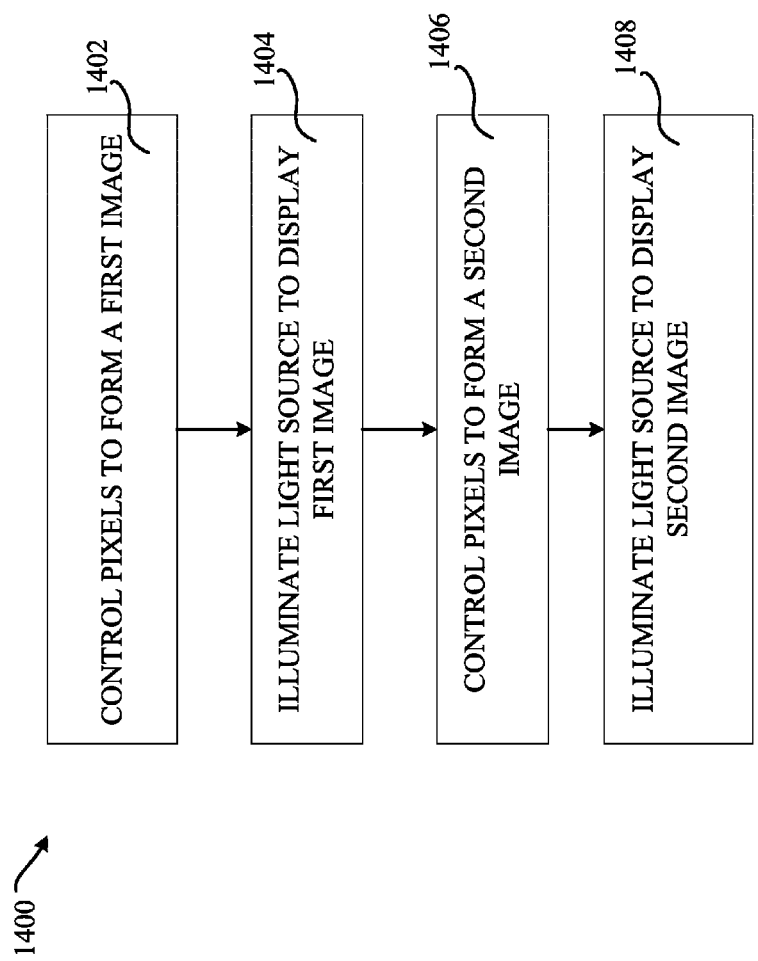
FIG. 14 shows an example flow diagram of a temporal multiplexing display process by which a controller can display 3D images.

FIG. 14 shows an example flow diagram of a temporal multiplexing display process 1400 by which a controller can display 3D images. The display process 1400 begins with controlling a first set of pixels to form a first image (block 1402). A light source is illuminated to display the first image (block 1404). The same set of pixels is controlled to form a second image (block 1406), and the light source is illuminated to display the second image (block 1408). In some implementations, the light source can be illuminated to form the first image and the second image at the same time.

As described above, the display process 1400 begins with controlling a set of pixels (block 1402) to selectively obstruct a plurality of respective apertures to form a first image. The first image has an angular distribution of light weighted towards a first eye of a viewer. The controller can cause the pixels to be driven into a first set of states determined based on input data associated with the first image. In some implementations, the pixels are formed from shutter-based MEMS light modulators.

Upon controlling the array of pixels to their desired states (block 1402), the controller illuminates one or more light sources to display the first image (block 1404). Light from the light source, such as a back light, passes through the respective apertures of the corresponding pixels to display a first image. The light forming the first image has an angular distribution that is weighted more heavily towards a direction of the first eye of the viewer.

The controller also controls the same set of pixels to form a second image (block 1406). The second image has an angular distribution of light weighted more heavily towards a second eye of the viewer. The controller causes the pixels to be driven into a second set of states determined based on the input data associated with the second image.

Upon controlling the same set of pixels into their desired states (block 1406), the controller can illuminate one or more light sources to display the second image (block 1408). Light from the light source passes through the respective apertures of the corresponding pixels to display the second image. The light forming the second image has an angular distribution that is weighted more heavily towards a direction of the second eye of the viewer. Using this process 1400, a controller can generate 3D images on a display apparatus having an array of MEMS shutter-based pixels.

Figure 15:
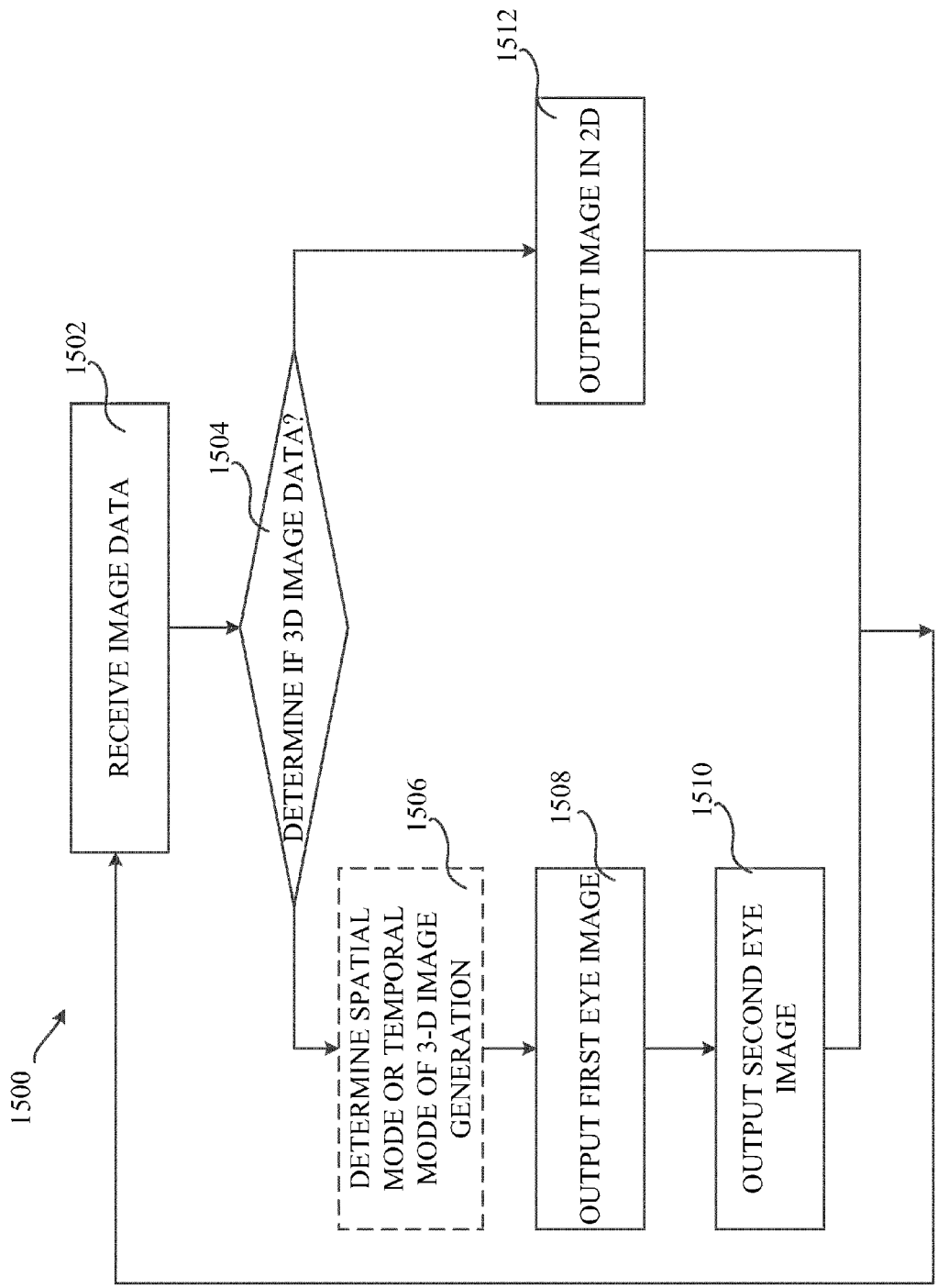
FIG. 15 shows an example flow diagram of a display process for displaying images.

FIG. 15 shows an example flow diagram of a display process 1500 for displaying images. The display process 1500 begins with receiving image data (block 1502). A determination whether the image data is 3D image data is made (block 1504). If the image data is 3D image data, a first eye image is output (block 1508) and a second eye image is output (block 1510). For some display apparatus that can generate 3D images using either spatial multiplexing or temporal multiplexing, prior to generating the first eye image (block 1508) and the second eye image (1510), the display apparatus makes a determination whether to use spatial multiplexing or temporal multiplexing (block 1506). If the image data is not 3D image data, a 2D image is output by the pixels of the display apparatus (block 1512).

As described above, the display process 1500 begins with a display apparatus receiving image data (block 1500) to be displayed. The display apparatus determines if the image data is 3D (block 1504). The image data may correspond to 2D images or 3D images. In some implementations, the image data may include metadata or some other form of identification that identifies the image data as being 2D or 3D. The display apparatus can determine that the image data is 3D by evaluating this metadata.

Some display apparatus can generate 3D images using either spatial multiplexing or temporal multiplexing. An example of such display apparatus is the display apparatus 1350 of FIG. 13. Thus, if it is determined that a received image is a 3D image at block 1504, such a display apparatus determines whether to use spatial multiplexing or temporal multiplexing (block 1506) to generate the 3D image. One example factor that can influence the type of multiplexing to utilize includes the frame rate associated with a video incorporating the image being displayed. Images in a video having a higher frame rate may be more suitable for display using spatial multiplexing. Images in videos having a lower frame rate may be more suitable for display using temporal multiplexing for display. Another factor that can be considered is the level of complexity of the image. If the image has a high level of variation or fine details, temporal multiplexing may be more suitable. For displays utilizing time division gray scale to generate different colors, a third factor can be the amount of variation in colors in the image. An image having many similar colors may be more suitable for display using spatial multiplexing instead of temporal multiplexing. In such cases, time is better spent in presenting the image with an increased number of bitplanes to appropriately display the different colors. In some implementations, the display apparatus can determine to use spatial multiplexing or temporal multiplexing, for example, on a frame by frame basis or once for a single piece of media.

In some implementations, image frames can be displayed at frame rates ranging from about 24 Hz to 240 Hz. In some implementations, the image frames can be displayed at a frame rate of about 60 Hz. In such implementations, each image frame has a frame time of about 16.6 ms. Accordingly, at a frame rate of 60 Hz, which corresponds to a frame rate of about 16.6 ms, the illumination time can be about 8.3 ms. In implementations that utilize temporal multiplexing, for example, in which pixels display left-eye images and right-eye images in an alternating manner, the frame rate at which left eye images and the right eye images are displayed may be twice the total frame rate. As such, to achieve a total frame rate of about 60 Hz, the frame rate at which left eye images and the right eye images are displayed may be about 120 Hz. Although frame rates can be lower than 60 Hz, in some implementations, the frame rates are greater than 60 Hz to mitigate the occurrence of image artifacts, such as flicker.

In some implementations that utilize spatial multiplexing, in which a left eye image and a right eye image are displayed simultaneously, the frame rates at which the left eye images and the right eye images are displayed may be substantially the same as the total frame rate. For example, if image frames are to be displayed at a frame rate of 60 Hz, the left eye image frames and the right eye image frames can be displayed at a frame rate of 60 Hz.

Assuming the image is a 3D image, the display apparatus outputs a first eye image (block 1508) and a second eye image (block 1510). As described above, the first eye image may be formed by displaying light angled towards a first side of the display apparatus and a second eye image may be formed by displaying light angled towards a second side of the display apparatus opposite the first side. In display apparatus that are designed (or have elected) to use spatial multiplexing to generate a 3D images, a first set of light modulators are actuated into states appropriate for forming the first eye image. A second set of light modulators are actuated into states appropriate for the second eye image. In a spatial multiplexing arrangement, the first eye image and the second eye image are typically displayed simultaneously, though in some implementations they also may be displayed sequentially. In a temporal multiplexing arrangement, the first eye image and the second eye image are displayed sequentially since the same light modulators are used to display both the first eye image and the second eye image.

If the image data is not 3D image data (block 1504), the display apparatus outputs image in 2D (block 1512). An image is perceived in 2D if the images perceived by the left eye and the right eye of the viewer are identical for display apparatus with dedicated first eye pixels and second eye pixels, such as display apparatus 950 depicted in FIG. 9, display apparatus output identical images through both sets of pixels. For display apparatus capable of generating neutral images, for example, display apparatus 1350 depicted in FIG. 13, such display apparatus output utilize this capability to generate a 2D image. To generate a 2D image, By doing so, images perceived by the left eye and the right eye of the viewer are not offset from one another and no depth is perceived.

Figure 16A:
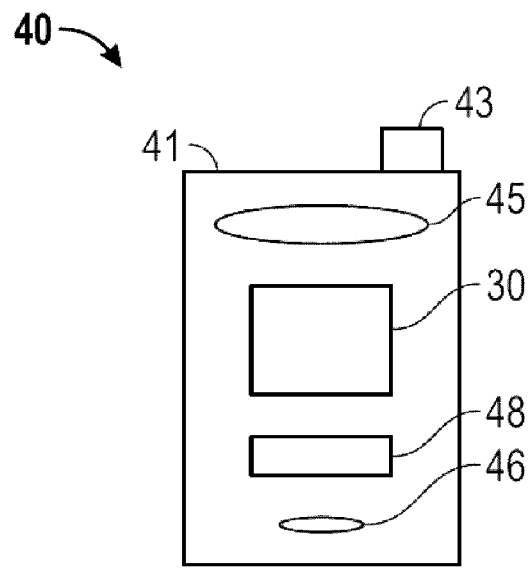
FIGS. 16A and 16B are system block diagrams illustrating a display device that includes a plurality of display elements.
Figure 16B:
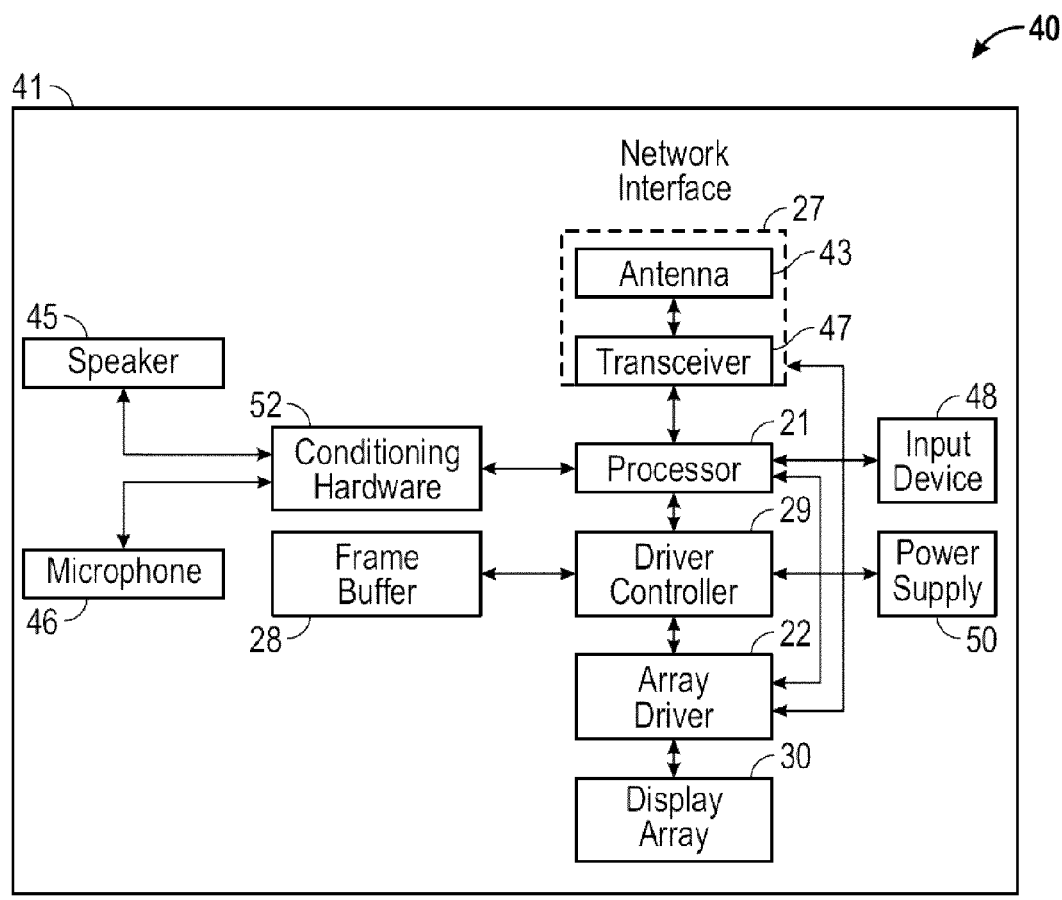

FIGS. 16A and 16B are system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device.

The components of the display device 40 are schematically illustrated in FIG. 16A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 16A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can preprocess the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22, and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as the controller 134 described above with respect to FIG. 1). Additionally, the array driver 22 can be a conventional driver or a bi-stable display driver. Moreover, the display array 30 can be a conventional display array or a bi-stable display array (such as a display including an array of display elements, such as light modulator array 320 depicted in FIG. 3). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. a general purpose processor may be a microprocessor, or, any conventional processor, controller, microcontroller, or state machine. a processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. a storage media may be any available media that may be accessed by a computer. by way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for displaying three-dimensional (3D) images, comprising:
    an array of shutter-based display elements, each display element configured to drive a shutter between at least three positions relative to a corresponding aperture, the at least three positions including a closed position, a first eye open position, and a second eye open position, and wherein, in the first eye open position, light transmitted by the display element includes an angular distribution of light weighted towards a first side of the apparatus and in the second eye open position, light transmitted by the display element includes an angular distribution weighted towards a second side of the apparatus, opposite the first side; and
    a controller configured to:
        control a set of display elements in the array to form, at a first time, a first eye image corresponding to input data by causing each of the display elements to drive its corresponding shutter into either the closed position or the first eye open position based on the input data, wherein the first eye image includes an angular distribution of light weighted towards the first side of the apparatus; and
        control the same set of display elements in the array to form, at a second time, a second eye image corresponding to input data by causing each of the display elements to drive its corresponding shutter into either the closed position or the second eye open position based on the input data, wherein the second eye image includes an angular distribution of light weighted towards the second side of the apparatus.

2. The apparatus of claim 1, wherein in the first eye open position the shutter partially obstructs a first portion of the corresponding aperture, and in the second eye open position the shutter partially obstructs a second portion of the aperture opposite the first portion of the aperture.

3. The apparatus of claim 2, wherein the controller is configured to cause at least one display element to be driven into the first eye open position by causing a first voltage to be applied to an actuator coupled to the display element and to be driven into the second eye open position by causing a second, different voltage to be applied to the actuator.

4. The apparatus of claim 2, wherein the display elements are configured to drive their respective shutters into a third-open position that provides a neutral distribution of light.

5. The apparatus of claim 4, wherein the controller is configured to generate two-dimensional images by causing the display elements to drive their respective shutters into either the closed position or the third open position based on the input data.

6. The apparatus of claim 1, further comprising:
a rear aperture layer comprising a plurality of rear apertures; and
a front aperture layer comprising a plurality of front apertures, wherein the array of display elements is positioned between the rear aperture layer and the front aperture layer.

7. The apparatus of claim 6, wherein the front aperture layer includes a light blocking material.

8. The apparatus of claim 6, wherein the rear aperture layer includes a first surface proximate the array of display elements, the first surface of the aperture layer including at least one of a reflective material and a light absorbing material.

9. The apparatus of claim 1, wherein the shutters include at least one of electromechanical systems (EMS) devices and microelectromechanical systems (MEMS) devices.

10. The apparatus of claim 1, further comprising:
a display module incorporating the array of display elements and the controller;
a processor configured to process image data; and
a memory device that is configured to communicate with the processor.

11. The apparatus of claim 10, wherein the controller comprises at least one of the processor and the memory device.

12. The apparatus of claim 10, further comprising:
a driver circuit configured to send at least one signal to the display module; and wherein
the processor is further configured to send at least a portion of the image data to the driver circuit.

13. The apparatus of claim 10, further comprising:
an image source module configured to send the image data to the processor, wherein the image source module comprises at least one of a receiver, transceiver, and transmitter.

14. The apparatus of claim 10, further comprising:
an input device configured to receive input data and to communicate the input data to the processor.

15. A display apparatus for generating three-dimensional (3D) images, comprising:
a rear aperture layer including a plurality of rear apertures;
a first set of electromechanical systems (EMS) shutter-based display elements, each including a shutter having a plurality of light blocking portions and at least one shutter aperture formed therein, the display elements configured to be driven between a non-transmissive state in which the light blocking portions of the shutter block substantially all light passing through a corresponding rear aperture and a first light-transmissive state in which a center of the at least one shutter aperture of the shutter is offset relative to a center of a corresponding rear aperture in a first direction such that light passing through the at least one shutter aperture has an angular distribution weighted more heavily towards the first direction; and
a second set of EMS shutter-based display elements, each including a shutter having a plurality of light blocking portions and at least one shutter aperture formed therein, the display elements configured to be driven between the non-transmissive state in which the light blocking portions of the shutter block substantially all light passing through a corresponding rear aperture and a second light-transmissive state in which a center of the at least one shutter aperture of the shutter is offset relative to a center of a corresponding rear aperture in a second direction such that light passing through the at least one shutter aperture has an angular distribution weighted more heavily towards the second direction.

16. The display apparatus of claim 15, wherein the first set of EMS shutter-based display elements form a first-eye image that includes an angular distribution of light weighted towards a first side of the display apparatus and the second set of EMS shutter-based display elements form a second-eye image that includes an angular distribution of light weighted towards a second side of the display apparatus.

17. The display apparatus of claim 16, wherein:
the first set of shutter-based display elements includes a plurality of first optical elements corresponding to the corresponding rear apertures and configured to direct light towards the first side of the display apparatus; and
the second set of shutter-based display elements includes a plurality of second optical elements corresponding to the corresponding rear apertures and configured to direct light towards the second side of the display apparatus.

18. The display apparatus of claim 17, wherein the first optical elements and the second optical elements include at least one of microlenses and prisms.

19. The display apparatus of claim 15, further comprising:
a front aperture layer comprising a plurality of front apertures, wherein the first set of EMS shutter-based display elements and the second set of EMS shutter-based display elements are positioned between the rear aperture layer and the front aperture layer.

20. The display apparatus of claim 19, wherein the front aperture layer includes a first surface including a light blocking material.

21. The display apparatus of claim 20, wherein the rear aperture layer includes a first surface including at least one of a reflective material and a light absorbing material.

22. The display apparatus of claim 20, wherein the EMS shutter-based display elements comprises microelectromechanical systems (MEMS) devices.

23. A method for generating three-dimensional (3D) images using a display, comprising:
controlling an array of shutter based display elements, each including a shutter, to form, at a first time, a first eye image corresponding to input data by causing each of the display elements to drive its corresponding shutter into either a closed position or a first eye open position based on the input data, wherein the first eye image includes an angular distribution of light weighted towards a first side of the display;
illuminating a light source to display the first eye image;
controlling the array of display elements to form, at a second time, a second eye image corresponding to input data by causing each of the same display elements to drive its corresponding shutter into either the closed position or the second eye open based on the input data, wherein the second eye image includes an angular distribution of light weighted towards a second side of the display; and
illuminating the light source to display the second eye image,
wherein in the first eye open position, light transmitted by a display element includes an angular distribution of light weighted towards the first side of the apparatus and in the second eye open position, light transmitted by a display element includes an angular distribution weighted towards the second side of the apparatus.

24. The method of claim 23, wherein the shutters are driven into the first eye open position by applying a first voltage to actuators associated with the shutters, and wherein the shutters are caused to be driven into the second eye open position by applying a second different voltage to the actuators associated with the shutter.

25. The method of claim 23, wherein the shutters have light blocking portions that overlap a first portion of their corresponding apertures when the shutters are driven into the first eye open position and overlap a second different portion of the corresponding apertures when the shutters are driven into the second eye open position.

26. The method of claim 23, further comprising:
controlling the array of display elements to form a neutral image corresponding to input data by causing the same display elements drive their respective shutters into a third open position, wherein a neutral image includes an angular distribution of light weighted substantially equally towards a first side of the display and the second side of the display; and
illuminating the light source to display the neutral image.

27. The method of claim 23, wherein the first eye image and the second eye image are displayed according to a subframe sequence in which the first eye image and the second eye image are displayed in an alternating manner.

28. A non-transitory computer-readable storage medium having computer-executable instructions stored thereon, which when executed by a computer, cause the computer to:
control an array of shutter based display elements, each including a shutter, to form, at a first time, a first eye image corresponding to input data by causing each of the display elements to drive its corresponding shutter into either the closed position or a first eye open position based on the input data, wherein the first eye image includes an angular distribution of light weighted towards a first side of the display;
illuminate a light source to display the first eye image;
control the array of display elements to form, at a second time, a second eye image corresponding to input data by causing each of the same display elements to drive its corresponding shutter into either the closed position or a second eye open position-based on the input data, wherein the second eye image includes an angular distribution of light weighted towards a second side of the display; and
illuminate the light source to display the second eye image, wherein in the first eye open position, light transmitted by a display element includes an angular distribution of light weighted towards the first side of the apparatus and in the second eye open position, light transmitted by a display element includes an angular distribution weighted towards the second side of the apparatus, opposite the first side.

29. The non-transitory computer-readable storage medium of claim 28, wherein the computer executable instructions, when executed by the computer, cause the computer to cause the shutters to be driven into the first eye open position by causing a first voltage to be applied to actuators associated with the shutters and to cause the shutters to be driven into the eye open position by causing a second, different voltage to be applied to the actuators associated with the shutters.

30. The non-transitory computer-readable storage medium of claim 28, further comprising computer-executable instructions, which when executed by the computer, cause the computer to:
control the array of display elements to form a neutral image corresponding to input data by causing the same display elements drive their respective shutters into a third open position, wherein a neutral image includes an angular distribution of light weighted substantially equally towards a first side of the display and the second side of the display; and
illuminate the light source to display the neutral image.

* * * * *